(12) United States Patent
Tomikawa et al.

(10) Patent No.: US 8,614,934 B1
(45) Date of Patent: Dec. 24, 2013

(54) METHOD FOR CHARACTERIZATION EVALUATION OF THERMALLY-ASSISTED MAGNETIC RECORDING DEVICE

(75) Inventors: Satoshi Tomikawa, Tokyo (JP); Tomohito Mizuno, Tokyo (JP); Kenichi Takano, Tokyo (JP); Makoto Moriya, Tokyo (JP)

(73) Assignee: TDK Corporation, Tokyo (JP)

( * ) Notice: Subject to any disclaimer, the term of this patent is extended or adjusted under 35 U.S.C. 154(b) by 16 days.

(21) Appl. No.: 13/571,527

(22) Filed: Aug. 10, 2012

(51) Int. Cl.
*G11B 11/00* (2006.01)

(52) U.S. Cl.
USPC .................................. 369/13.33; 369/13.13

(58) Field of Classification Search
USPC .......... 369/13.02, 13.13, 13.17, 13.32, 13.33; 360/59; 385/129; 29/603.07–603.27
See application file for complete search history.

(56) References Cited

U.S. PATENT DOCUMENTS

| 6,515,814 B1 * | 2/2003 | Hamamoto et al. ............ 360/59 |
| 6,680,609 B1 | 1/2004 | Fang et al. |
| 6,801,377 B2 | 10/2004 | Kasajima et al. |
| 6,989,949 B2 | 1/2006 | Cheng et al. |
| 7,119,537 B2 | 10/2006 | Che et al. |
| 7,843,658 B2 | 11/2010 | Kiyono |
| 8,179,624 B2 * | 5/2012 | Inomata ......................... 360/25 |
| 2012/0230169 A1 | 9/2012 | Shimazawa et al. |
| 2012/0232831 A1 | 9/2012 | Mizuno et al. |

FOREIGN PATENT DOCUMENTS

JP          A-2000-011336       1/2000

* cited by examiner

*Primary Examiner* — Wayne Young
*Assistant Examiner* — Brenda Bernardi
(74) *Attorney, Agent, or Firm* — Posz Law Group, PLC

(57) ABSTRACT

Using a thermally-assisted magnetic recording device, a reference signal is recorded to a magnetic recording medium. After heating each of first and second heating points, where the first and second heating point being positioned respectively at inner and outer sides along a track width direction with respect to a track width center point of a recording bit where the reference signal is recorded, the reproducing signal intensity of the reference signal is measured. Then, obtaining a maximum distance between the first heating point and the second heating point when a reproducing signal intensity measurement value of the reference signal after the magnetic recording medium is heated is approximately zero. Based on the maximum distance, a characterization of the thermally-assisted magnetic recording device is evaluated.

6 Claims, 12 Drawing Sheets

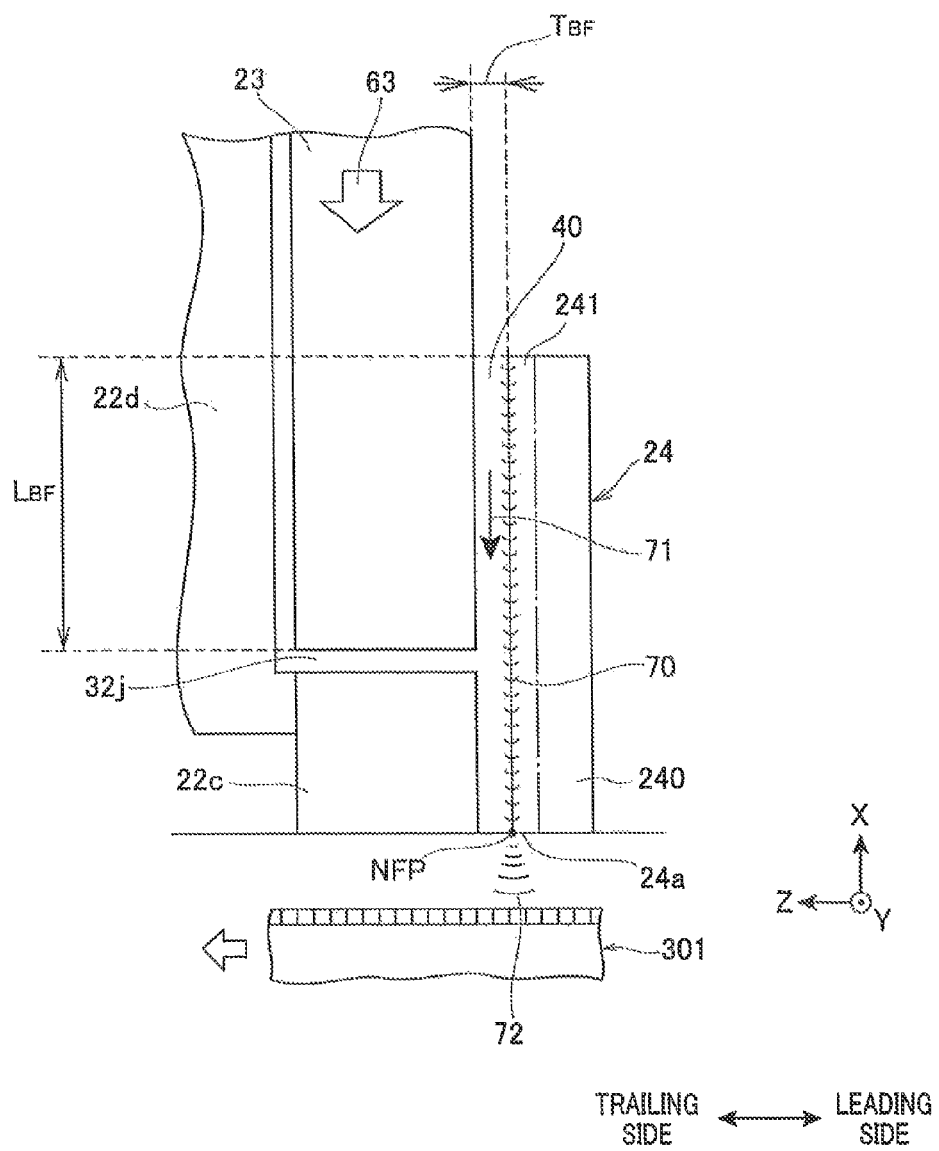

METHOD FOR CHARACTERIZATION EVALUATION OF THERMALLY-ASSISTED MAGNETIC RECORDING DEVICE

BACKGROUND OF THE INVENTION

1. Field of the Invention

The present invention relates to a magnetic recording medium and a method for evaluating characterization of a thermally-assisted magnetic recording device that is provided with a thermally-assisted magnetic recording head.

2. Description of the Related Art

In the field of magnetic recording using a head and a medium, further performance improvements of thin film magnetic heads and magnetic recording media have been demanded in conjunction with a growth of high recording density of magnetic disk devices. Currently, composite type thin film magnetic heads are widely used for the thin film magnetic heads. The composite type thin film magnetic heads are configured with a configuration in which a magnetoresistive (MR) element for reading and an electromagnetic conversion element for writing are laminated.

The magnetic recording medium is a discontinuous medium in which magnetic grains are aggregated and each of the magnetic grains has a single magnetic domain structure. In this magnetic recording medium, a single recording bit is configured with a plurality of magnetic grains. Therefore, in order to increase recording density, asperities at a border between adjacent recording bits need to be reduced by decreasing the sizes of the magnetic grains. However, reducing the magnetic grains in size leads to a decrease in the volumes of the magnetic grains, and thereby drawbacks that thermal stability of magnetization in the magnetic grains decreases occur.

As a countermeasure against this problem, increasing magnetic anisotropy energy Ku of magnetic grains may be considered; however, the increase in Ku causes an increase in an anisotropic magnetic field (coercive force) of the magnetic recording medium. On the other hand, the upper limit of the recording magnetic field intensity of the thin film magnetic head is substantially determined by saturation magnetic flux density of a soft magnetic material configuring a magnetic core in the head. As a result, when the anisotropic magnetic field of the magnetic recording medium exceeds an acceptable value determined by the upper limit of the recording magnetic field intensity, it becomes impossible to record to the magnetic recording medium. Currently, as a method to solve such thermal stability problem, a so-called thermally-assisted magnetic recording method has been proposed in which, while a magnetic recording medium formed of a magnetic material with large Ku is used, under a state where the anisotropic magnetic field is reduced by heating the magnetic recording medium, a recording magnetic field is applied and the recording of information is performed.

In the thermally-assisted magnetic recording method, a method that uses a near-field light probe, which is a so-called plasmon-generator, that is a metal piece that generates near-field light from plasmon excited by laser light is generally known. As a magnetic recording head provided with such a plasmon-generator, proposed is a magnetic recording head provided with a magnetic pole, a waveguide, a plasmon-generator having a propagation edge opposing the waveguide (U.S. patent application Ser. No. 13/046,117).

In the thermally-assisted magnetic recording head, light propagating through the waveguide couples to the plasmon-generator in a surface plasmon mode so as to excite surface plasmon, and the surface plasmon propagates through the plasmon-generator (propagation edge), so that the near-field light is generated at the near-field light generating portion that is positioned in an air bearing surface side end part of the propagation edge. Furthermore, a magnetic recording medium is heated when the near-field light that is generated in the near-field light generating portion of the plasmon-generator is radiated to the magnetic recording medium, a magnetic field is applied under a state where an isotropic magnetic field of the magnetic recording medium is reduced, and thereby information is recorded.

In a thermally-assisted magnetic disk device provided with such a thermally-assisted magnetic recording head, characterizations of recording density, recording width, signal-to-noise (SN) ratio, bit error rate (BER), etc. are determined by receiving not only an effect from a magnetic field applied to the magnetic recording medium but also a thermal effect from radiated near-field light. Therefore, in order to evaluate the characterization of the thermally-assisted magnetic disk device, a parameter that is related to heat due to the radiated near-field light is needed to concern. Especially in recent years, steep magnetization reversal between adjacent recording bits of the magnetic recording medium and high recording density and high SN ratio are highly demanded, and a thermally-assisted magnetic recording device that can satisfy such demand has been developed. Through the development, a proposal of a method that highly precisely evaluates the characterization of the device upon a concern of a parameter related to heat has been demanded.

SUMMARY OF THE INVENTION

An object of the present invention is to provide a method that precisely evaluates the characterization of a thermally-assisted magnetic recording device provided with a magnetic recording medium and a thermally-assisted magnetic recording head upon a consideration of a parameter related to heat.

In order to achieve the object, the present invention provides a method for characterization evaluation of a thermally-assisted magnetic recording device that is provided with a magnetic recording medium and a thermally-assisted magnetic recording head, including: a recording step for recording a reference signal to the magnetic recording medium using the thermally-assisted magnetic recording head; a heating step for heating a first heating point and a second heating point on the magnetic recording medium using the thermally-assisted magnetic recording head, the first heating point being positioned at an inner side along a track width direction with respect to a track width center point of a recording bit, where the reference signal is recorded, of the magnetic recording medium, and the second heating point being positioned at an outer side along the track width direction with respect to the track width center point, wherein a distance between the second heating point and the track width center point is substantially the same as a distance between the track width center point and the first heating point, a measurement step for measuring the reproducing signal intensity of the reference signal after the magnetic recording medium is heated; a step for obtaining a maximum distance between the first heating point and the second heating point when a reproducing signal intensity measurement value of the reference signal after the magnetic recording medium is heated is approximately zero; and an evaluation step for evaluating a characterization of the thermally-assisted magnetic recording device based on the maximum distance, wherein in the heating step, the first heating point and the second heating point are heated without applying a recording magnetic field from the thermally-assisted magnetic recording head to the magnetic recording medium (First Invention).

Note, in the present invention, "a reproducing signal intensity measurement value of a reference signal is approximately zero" means that signal intensity of the reference signal is attenuated such that the reference signal cannot read by the thermally-assisted magnetic head in the thermally-assisted magnetic recording device as a characterization evaluation target. Specifically, for example, it means that the attenuation rate from the reproducing signal intensity of the reference signal before both the first heating point and the second heating point are heated is 97% or more, preferably 100%.

As characterizations that can be evaluated in the present invention are, for example, characterizations regarding magnetic recording such as a recording density, recording width, heating spot diameter on the magnetic recording medium, thermal gradient on the magnetic recording medium, etc.

In the above invention (First Invention), it is preferred that the heating step includes a first heating step for heating a first heating point and a second heating point that are positioned such that the reproducing signal intensity measurement value of the reference signal after heating is not approximately zero; and an n-th ("n" is a whole number of two or more) heating step for heating the first heating point and the second heating point that are positioned such that the reproducing signal intensity measurement value of the reference signal after heating is approximately zero, wherein the distance between the first heating point and the second heating point is the maximum distance, in each of the heating steps, the magnetic recording medium is heated such that a distance between the first heating point and the second heating point in a m-th ("m" is a whole number of two or more and "n" or less) heating step is shorter than a distance between the first heating point and the second heating point in a (m−1)-th heating step, and the measurement step is performed after each of the heating steps (Second Invention).

In the above invention (First Invention), it is preferred to further include a profile generation step for obtaining a maximum distance between the first heating point and the second heating point under a heating condition with which at least both of temperatures in the first heating point and the second heating point on the magnetic recording medium are a predetermined temperature, and for generating a profile illustrating a temperature distribution on the magnetic recording medium when the reproducing signal intensity measurement value of the reference signal after the magnetic recording medium is heated under the heating condition is approximately zero; and a thermal gradient calculation step for calculating a thermal gradient on the magnetic recording medium when the reproducing signal intensity measurement value of the reference signal after the magnetic recording medium is heated is approximately zero, based on the profile generated in the profile generation step, wherein a characterization of the thermally-assisted magnetic recording device is evaluated based on the thermal gradient calculated in the thermal gradient calculation step (Third Invention).

In the above invention (First Invention), it is preferred to further include a profile generation step for obtaining a maximum distance between the first heating point and the second heating point in a heating condition with which at least both of temperatures in the first heating point and the second heating point on the magnetic recording medium are a predetermined temperature, and for generating a profile illustrating a relationship between the maximum distance and a maximum temperature on the magnetic recording medium when the reproducing signal intensity measurement value of the reference signal after the magnetic recording medium is heated under the heating condition is approximately zero; and a temperature distribution calculation step for calculating a temperature distribution on the magnetic recording medium during signal recording using the thermally-assisted magnetic recording device, based on the profile generated in the profile generation step, wherein a characterization of the thermally-assisted magnetic recording device is evaluated based on the temperature distribution calculated in the temperature distribution calculation step (Fourth Invention).

In the above invention (First Invention), it is preferred that, in the heating step, the magnetic recording medium is heated such that the temperatures in the first heating point and the second heating point in the recording layer of the magnetic recording medium is higher than a Curie temperature of a magnetic material configuring a magnetic particle in the recording layer of the magnetic recording medium (Fifth Invention).

In the above invention (First Invention), it is preferred that the thermally-assisted magnetic recording head includes: a magnetic pole that generates a recording magnetic field from an end surface that forms a portion of an air bearing surface opposing the magnetic recording medium; a waveguide through which light for exciting surface plasmon propagates; and a plasmon generator that generates near-field light from a near-field light generating end surface that forms a portion of the air bearing surface by being coupled with the light in a surface plasmon mode, wherein in the heating step, the first heating point and the second heating point are heated by radiating the near-field light generated from the plasmon generator on the first heating point and the second heating point (Sixth Invention).

According to the present invention, a method that precisely evaluates the characterization of the thermally-assisted magnetic recording device provided with the magnetic recording medium and the thermally-assisted magnetic recording head upon a consideration of a parameter related to heat can be provided.

BRIEF DESCRIPTION OF THE DRAWINGS

FIG. 14 is a cross-sectional view (XZ plane) schematically illustrating a thermally-assisted magnetic recording method using a surface plasmon mode of the magnetic head according to the embodiment of the present invention.

DESCRIPTION OF THE PREFERRED EMBODIMENTS

Figure 1A:
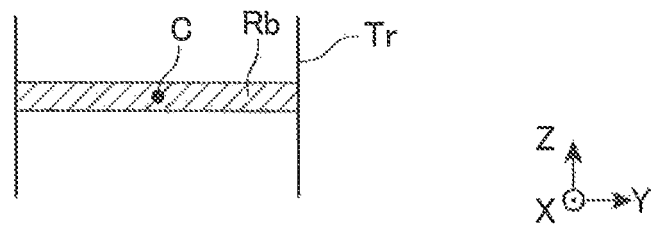
FIG. 1 is a plan view of a magnetic disk that schematically illustrates steps for obtaining a distance between two heating points when a reference signal is erased in a method for evaluating a characterization of a thermally-assisted magnetic disk device according to one embodiment of the present embodiment.

Prior to explaining embodiments of the present invention, terminologies used in the present specification are defined. In a lamination structure or an element structure formed on an element formation surface of a slider substrate of a magnetic head according to embodiments of the present invention, from a perspective of a layer or element to be a reference, a substrate side is referred to as "lower (below)," and an opposite side is referred to as "upper (above)." In addition, in the magnetic head according to one embodiment of the present invention, "X, Y and Z axis directions" are defined in some of the drawings as necessary. Here, the Z axis direction corresponds to the above-described "up and down directions", +Z side corresponds to a trailing side, and −Z side corresponds to a leading side. Moreover, the Y axis direction is a track width direction, and the X axis direction is a height direction A method for characterization evaluation of the thermally-assisted magnetic disk device (thermally-assisted magnetic recording device) according to one embodiment of the present invention is explained with reference to the drawings.

FIG. 1 is a plan view of a magnetic recording medium (magnetic disk) that schematically illustrates steps for obtaining a distance between two heating points when a reference signal is erased in an evaluation method according to the present embodiment.

At first, a thermally-assisted magnetic disk device that is a target whose characterization is to be evaluated is prepared in the present embodiment. A device configuration of the thermally-assisted magnetic disk device as the characterization evaluation target is not specifically limited, and given as an example is a device provided with a magnetic disk (magnetic recording medium) for perpendicular magnetic recording and a magnetic head (thermally-assisted magnetic recording head). As such magnetic disk, given as an example is a disk having a configuration in which a soft magnetic under layer, an intermediate layer, and a magnetic recording layer (perpendicular magnetization layer) are sequentially laminated on a disk substrate. Also, as the magnetic head, given as an example is a magnetic head that includes at least a magnetic pole, a waveguide, a plasmon-generator, a light source, and an MR element. The magnetic pole opposes a surface of the magnetic disk at a predetermined gap (flying height) and generates a recording magnetic field from an end surface that forms a portion of an air bearing surface (ABS) as a medium opposing surface. The waveguide propagates light to excite surface plasmon. The plasmon-generator generates near-field light from a near-field light generating end surface that forms a portion of the ABS by being coupled with the light in a surface plasmon mode. The light source (for example, laser diode, etc). emits light to the waveguide. The MR element reproduces signals from the magnetic disk. Note, a detail (one example) of a specific configuration of the thermally-assisted magnetic disk device will be described later.

Next, as illustrated in FIG. 1A, using the thermally-assisted magnetic disk device that is a characterization evaluation target, a recording magnetic field is applied from the magnetic head in a state where near-field light is radiated to the magnetic disk from the plasmon-generator in the magnetic head of the thermally-assisted magnetic disk device, and a reference signal is recorded in at least one track Tr (recording bit Rb (for example, a track Tr positioned in substantially the center in a radial direction of the magnetic disk (recording bit Rd))) (recording step). Note, after the recording of the reference signal, by using the thermally-assisted magnetic head, the reference signal recorded in the track Tr (recording bit Rb) is reproduced and a reproducing signal intensity of the reference signal is measured.

A position of the track Tr (recording bit Rb) on the magnetic disk, where the reference signal is recorded, can be arbitrarily set within a movable range of the magnetic head in the magnetic disk radial direction, and is not particularly limited as long as the magnetic head can be positioned inside an inside border part of the track width direction (cross track direction) of the track Tr (recording bit Rb) and outside an outside border part thereof.

Figure 1B:
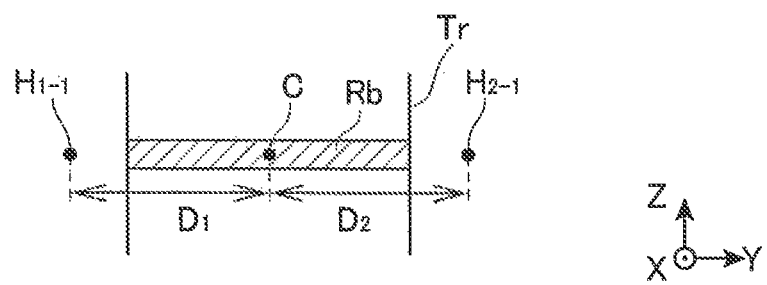

Next, as illustrated in FIG. 1B, near-field light generated from the plasmon-generator is respectively radiated to a first heating point $H_{1\text{-}1}$ and a second heating point $H_{2\text{-}1}$, and the first heating point $H_{1\text{-}1}$ and the second heating point $H_{2\text{-}1}$ are heated (first heating step). The first heating point $H_{1\text{-}1}$ is positioned at an inner side along the track width direction (cross track direction) with respect to a geometrical track width center point C in the track Tr (recording bit Rb) where the reference signal is recorded. The second heating point $H_{2\text{-}1}$ is positioned at an outer side along the track width direction (cross track direction). Specifically, the magnetic head is positioned such that the first heating point $H_{1\text{-}1}$ and the second heating point $H_{2-1}$ respectively coincide with substantially the center of light spot of near-field light, and near-field light is radiated.

At this time, it is set not to apply a recording magnetic field to the magnetic disk. By being set as described above, the characterization of the thermally-assisted magnetic disk device can be evaluated upon a consideration of an effect given by heat due to near-field light radiated from the plasmon-generator to the magnetic disk, and thereby the characterization can be precisely evaluated. Note, in some thermally-assisted magnetic disk device, a little magnetic field (magnetic field with an intensity that doesn't affect orientations (orientations of magnetizations) of magnetization easy axes (magnetic moment) of magnetic grains configuring the recording layer of the magnetic disk) is constantly generated from a magnetic pole thereof. However, a magnetic field with such a low intensity may be applied to the magnetic disk during the heating in the first heating step. The application of the magnetic field with such a low intensity to the magnetic disk doesn't affect the evaluation of a characterization of the thermally-assisted magnetic disk device in the present embodiment.

In the above-described first heating step, heating is performed by using near-field light generated from the magnetic head such that a temperature of the first heating point $H_{1-1}$ and the second heating point $H_{2-1}$ in the recording layer of the magnetic disk become a temperature of a Curie temperature (Tc) of a magnetic material configuring magnetic grains in the recording layer or higher. In the present embodiment as will be described below, a maximum distance EW between a first heating point $H_{1-n}$ and a second heating point $H_{2-n}$ when the reproducing signal intensity measurement value of the reference signal recorded in a recording bit is approximately zero is obtained (see FIG. 1D), and a characterization of the thermally-assisted magnetic disk device is evaluated based on the maximum distance EW. In other words, the magnetic disk is heated by using near-field light for the purpose of dispersing orientations (orientations of magnetizations) of the magnetization easy axes (magnetic moment) of a plurality of magnetic grains configuring the track Tr (recording bit Rb) where the reference signal is recorded to demagnetize (eventually, erase the reference signal) a recording magnetization of the track Tr (recording bit Rb). Therefore, the first heating point $H_{1-1}$ and the second heating point $H_{2-1}$ should be heated such that the temperature of the first heating point $H_{1-1}$ and the second heating point $H_{2-1}$ in the recording layer of the magnetic disk become a temperature at which orientations of the magnetization easy axes of the magnetic grains can be dispersed, that is a temperature higher than the Curie temperature (Tc), which is a temperature. For example, when the Curie temperature (Tc) of a magnetic material configuring the magnetic grains in the recording layer of the magnetic disk in the thermally-assisted magnetic disk device that is the characterization evaluation target is 550K, heating is performed such that a temperature of the first heating point $H_{1-1}$ and the second heating point $H_{2-1}$ become preferably 560K or more.

Specifically, by controlling an operating current of the light source (laser diode) in the thermally-assisted magnetic head, heating can be performed such that a surface temperature of the first heating point $H_{1-1}$ and the second heating point $H_{2-1}$ of the magnetic disk become a temperature higher than the curie temperature (Tc) of the magnetic material configuring the magnetic grains in the recording layer of the magnetic disk.

Note, it is difficult to directly measure the temperature of the first heating point $H_{1-1}$ and the second heating point $H_{2-1}$ in the recording layer because heating regions are extremely small and heating duration is extremely short. On the other hand, as will be described later, in the thermally-assisted magnetic disk device that is the characterization evaluation target according to the present embodiment, laser light radiated to a rear end surface of the waveguide from the laser diode propagates through the plasmon-generator in a surface plasmon mode as propagating through the waveguide, and near-field light is radiated from a near-field light generating end surface positioned on the ABS to the magnetic disk. Then, the magnetic disk (recording layer) is heated. Then, the laser diode as the light source oscillates laser light by a certain operating current applied. Therefore, in order to obtain the maximum distance EW between the first heating point $H_{1-1}$ and the second heating point $H_{2-1}$ according to the present embodiment (see FIG. 1D), it is needed to obtain a correlation between the operating current value of the laser diode and the temperature of the recording layer of the magnetic disk (first heating point $H_{1-1}$ and second heating point $H_{2-1}$).

Specifically, in the thermally-assisted magnetic disk device that is the characterization evaluation target, DC magnetization treatment (magnetization treatment to orient magnetization directions of all of the magnetic grains configuring the recording layer of the magnetic disk into the same direction) is performed to the magnetic disk by using the magnetic head. After that, a recording magnetic field with a predetermined magnetic field intensity (MFs) is applied from the magnetic pole of the magnetic head in a direction opposite to the magnetization direction by the DC magnetization treatment on the magnetic disk, and at the same time a predetermined operating current (Iop) is applied to the laser diode. As a result, near-field light is applied from the plasmon-generator to the magnetic disk. Then, noise is measured by reproducing the signal by the magnetic head.

Figure 2:
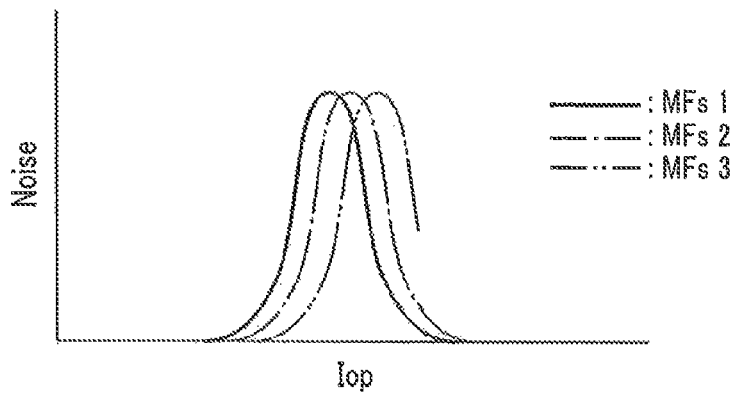
FIG. 2 is made to obtain the correlation between the operating current (Iop) applied to a laser diode and the temperature in a recording layer of the magnetic disk in the embodiment of the present invention, and is a graph that illustrates the relationship between the operating current (Iop) and the noise peak value.

The above-described noise measurement is performed as the magnetic field intensity (MFs) of the recording magnetic field applied to the magnetic disk is constant and the operating current (Iop) applied to the laser diode is varied (increased), and a graph showing the relationship between the noise value and the operating current (Iop) is prepared (see FIG. 2). Then, from the graph, the operating current (Iop) corresponding to a noise peak value can be obtained.

Figure 3:
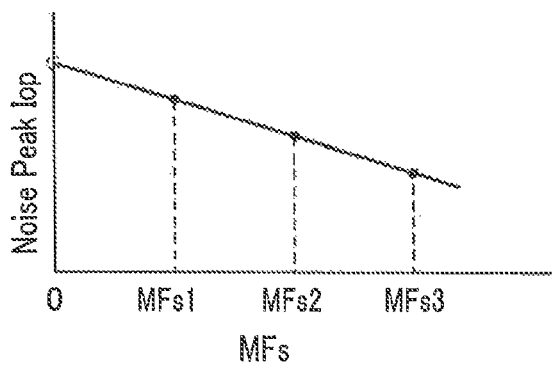
FIG. 3 is made to obtain the correlation between the operating current (Iop) applied to the laser diode and the temperature in the recording layer of the magnetic disk in the embodiment of the present invention, and is a graph that illustrates the relationship between the intensity of a recording magnetic field applied from a magnetic pole and the operating current (Iop) corresponding to a noise peak value.

By such noise measurement, as the magnetic field intensity (MFs) of the recording magnetic field applied to the magnetic disk is varied (MFs 1-3 in an example shown in FIG. 2), the operating current (Iop) corresponding to the noise peak value for each of the magnetic intensities (MFs) is obtained (see FIG. 2), and the correlation between the operating current (Iop) corresponding to the noise peak value and the recording magnetic field intensity is obtained (see FIG. 3). Then, from the graph showing the correlation (see FIG. 3), the operating current (Iop) corresponding to the noise peak value when the recording magnetic field intensity is zero is obtained.

It can be said that a temperature of the recording layer of the magnetic disk to which near-field light is radiated by applying the operating current (Iop) obtained as described above to the laser diode is a temperature at which most of magnetizations of the plurality of magnetic grains are erased by only heat without the application of magnetic field to the magnetic disk. In other words, the temperature can be defined as a Curie temperature (Tc) of a magnetic material configuring the magnetic grains in the recording layer of the magnetic disk. Note, a Curie temperature (Tc) of a magnetic material configuring magnetic grains in a recording layer of a magnetic disk in a thermally-assisted magnetic disk device that is a characterization evaluation target can be obtained beforehand by a hysteresis loop measurement, etc. at a high temperature.

After the relationship between the operating current (Iop) applied to the laser diode and the Curie temperature (Tc) of a magnetic material configuring the magnetic grains in the recording layer of the magnetic disk is obtained as described above, the relationship between the operating current (Iop) applied to the laser diode and the temperature of the recording layer of the magnetic disk is obtained.

Figure 4:
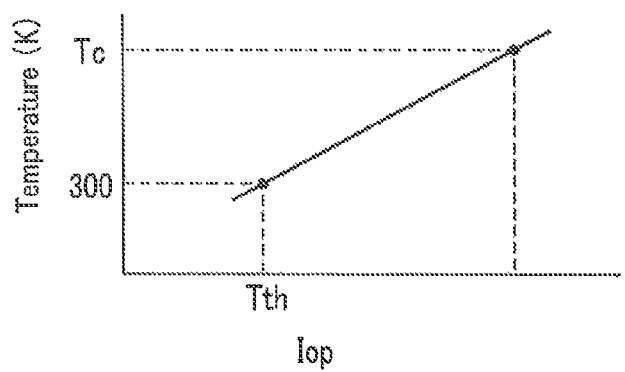
FIG. 4 is a graph that illustrates the correlation between the operating current (Iop) applied to the laser diode and the temperature in the recording layer of the magnetic disk in the embodiment of the present invention.

Because when an oscillation start current (Ith) of the laser diode is applied to the laser diode, the light intensity of near-field light generated from the plasmon-generator is approximately zero (light intensity with which the recording layer of the magnetic disk is not heated), it can be said that the temperature of the recording layer of the magnetic disk is normal temperature (300K). Because the operating current (Iop) applied to the laser diode and the light intensity of near-field light generated from the plasmon-generator are in a proportional relationship, it can be said that the operating current (Iop) and the temperature of the recording layer of the magnetic disk are substantially in a proportional relationship. Therefore, the correlation between the operating current (Iop) applied to the laser diode and the temperature of the recording layer of the magnetic disk (first heating point $H_1$ and second heating point $H_2$) can be obtained as a graph shown in FIG. 4. Based on the correlation, temperature of the recording layer of the magnetic disk (first heating point $H_1$ and second heating point $H_2$) can be obtained from the operating current (Iop) applied to the laser diode.

Therefore, in the present embodiment, based on the correlation between the temperature of the recording layer of the magnetic disk and the operating current (Iop) applied to the laser diode, which are obtained as described above, an operating current (Iop) with which the temperatures of the first heating point $H_1$ and the second heating point $H_2$ in the recording layer of the magnetic disk become the temperature higher than the Curie temperature (Tc) of a magnetic material configuring the magnetic grains in the recording layer of the magnetic disk is applied to the laser diode, and the heating points $H_1$ and $H_2$ are heated by irradiating near-field light to the first heating point $H_1$ and the second heating point $H_2$ of the magnetic disk.

As illustrated in FIG. 1B, the first heating point $H_{1-1}$ and the second heating point $H_{2-1}$ are positioned to be substantially symmetrical sandwiching the track width center point C in the track Tr (recording bit Rb) where a reference signal is recorded. In other words, the first heating point $H_{1-1}$ and the second heating point $H_{2-1}$ are positioned such that a distance $D_1$ between the track width center point C and the first heating point $H_{1-1}$ and a distance $D_2$ between the track width center point C and the second heating point $H_{2-1}$ become substantially the same.

Also, after that the first heating point $H_{1-1}$ and the second heating point $H_{2-1}$ are respectively heated in the first heating step, it is preferred that the first heating point $H_{1-1}$ and the second heating point $H_{2-1}$ are positioned such that the reproduction signal intensity measurement value of the reference signal recorded in the track Tr (recording bit Rb) does not become approximately zero. Also, it is further preferred that the first heating point $H_{1-1}$ and the second heating point $H_{2-1}$ are positioned such that the reproducing signal intensity measurement value is not approximately zero but is attenuated than a reproducing signal intensity measurement value of the reference signal before heating. In the present embodiment, as will be described later, a maximum distance EW between the first heating point $H_{1-1}$ and the second heating point $H_{2-n}$, where the above-described reproducing signal intensity measurement value becomes approximately zero is obtained, and a characterization of the thermally-assisted magnetic disk device is evaluated based on the maximum distance EW. On the other hand, when the first heating point $H_{1-1}$ and the second heating point $H_{2-1}$ are positioned in the first heating step such that the above-described reproducing signal intensity measurement value is approximately zero, it may become difficult to accurately judge a distance $(D_1+D_2)$ between the first heating point $H_{1-1}$ and the second heating point $H_{2-1}$ at those positions as a maximum distance EW that should be obtained in the present embodiment. As a result, it may become difficult to precisely evaluate a characterization of the thermally-assisted magnetic disk device.

Note, in the present embodiment, after that the magnetic head is positioned on either the first heating point $H_1$ or the second heating point $H_2$ (for example, the first heating point $H_1$) and near-field light is radiated, the magnetic disk is positioned on the other (for example, the second heating point $H_2$) and near-field light is radiated. Thereby, the first heating point $H_1$ and the second heating point $H_2$ positioned on both sides (inner and outer sides) in the track width direction of the track Tr (recording bit Rb) of the magnetic disk where a reference signal is recorded can be heated.

After the first heating point $H_{1-1}$ and the second heating point $H_{2-1}$ are heated in the first heating step, the reference signal recorded in the track Tr (recording bit Rb) is reproduced, and the reproducing signal intensity of the reference signal is measured (measurement step).

Figure 1C:
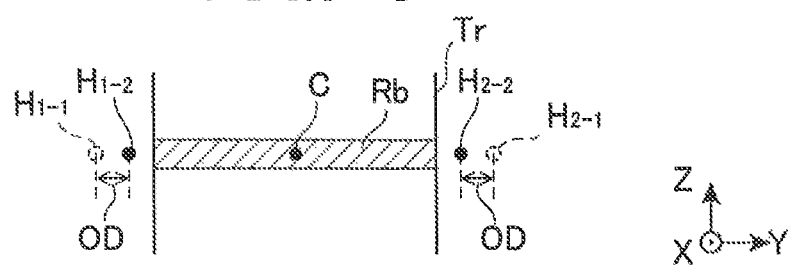

Next, as illustrated in FIG. 1C, a first heating point $H_{1-2}$ and a second heating point $H_{2-2}$ are newly set at positions that are closer to the track width center point C by a predetermined distance OD along the track width direction (cross track direction) than the first heating point $H_{1-1}$ and the second heating point $H_{2-1}$ in the first heating step (see FIG. 1B). The newly set first heating point $H_{1-2}$ and second heating point $H_{2-2}$ are heated (second heating step), the reference signal recorded in the track Tr (recording bit Rb) after heating is reproduced, and the reproducing signal intensity of the reference signal is measured. Thereafter, although not illustrated, a first heating point $H_{1-3}$ and a second heating point $H_{2-3}$ are further newly set at positions that are closer to the track width center point C by the predetermined distance OD along the track width direction (cross track direction) than the first heating point $H_{1-2}$ and the second heating point $H_{2-2}$ in the second heating step (see FIG. 1C) (third heating step).

The reference signal recorded in the track Tr (recording bit Rb) after heating is reproduced, and the reproducing signal intensity of the reference signal is measured.

A heating step in which positions that are closer to the track width center point C by the predetermined distance OD than a first heating point $H_{1-(m-1)}$ and a second heating point $H_{2-(m-1)}$ in an immediate previous heating step (m−1)th (m is a whole number that is two or more and n or less) heating step) are heated as a new first heating point $H_{1-m}$ and a new second heating point $H_{2-m}$ (m th heating step) and a measurement step in which the reproducing signal intensity of the reference signal is measured after the first heating points $H_{1-1}$–$H_{1-m}$ and the second heating points $H_{2-1}$–$H_{2-m}$ are heated in heating steps are repeatedly performed until the reproducing signal intensity of the reference signal after heating becomes approximately zero.

The distance OD between the first heating point $H_{1-(m-1)}$ (or the second heating point $H_{2-(m-1)}$) in a m−1th heating step and the first heating point $H_{1-m}$ (or the second heating point $H_{2-m}$) in a m th heating step (offset distance OD from a position of the magnetic head that radiates near-field light to the first heating point $H_{1-(m-1)}$ (or the second heating point $H_{2-(m-1)}$ in the m−1th heating step to a position of the magnetic head in the m th heating step) is not particularly limited. However, the distance can be arbitrarily set depending on a magnetic recording width (width of one track Tr (recording bit Rb) in the track width direction (cross track direction)) in the thermally-assisted magnetic disk device, and can be arbitrarily set within, for example, 2.0-10.0 nm. Note, in each heating step, the distance OD may be set to be constant, and the distance OD may be varied by gradually decreasing the distance OD as the step proceeds from the first heating step to the n-th heating step or by another way, which will be described later.

Figure 1D:
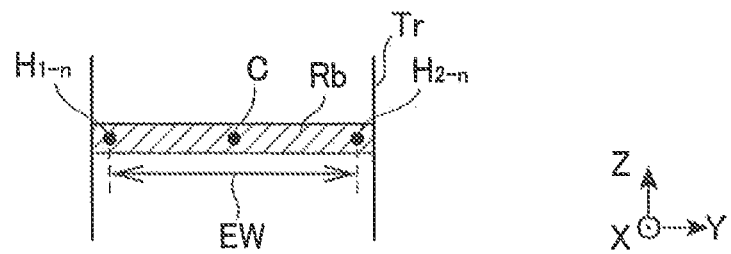

Then, when the reproducing signal intensity of the reference signal is approximately zero in a measurement step, a distance between the first heating point $H_{1-n}$ and the second heating point $H_{1-n}$ in a heating step (nth (n is a whole number that is two or more) heating step) in which the magnetic disk (first heating point $H_{1-n}$ and second heating point $H_{2-n}$) is heated just before the measurement step is obtained as the maximum distance EW where the reproducing signal intensity of the reference signal is approximately zero (see FIG. 1D).

In the present embodiment, various characterizations of the thermally-assisted magnetic disk device are evaluated based on the maximum distance EW obtained as described above, and next an evaluation method thereof is explained.

<Characterization Evaluation by Thermal Gradient of Recording Layer of Magnetic Disk>

Based on the maximum distance EW obtained as described above, a thermal gradient of the magnetic disk (recording layer) in the thermally-assisted magnetic disk device is obtained. In the thermally-assisted magnetic disk device, when the magnetic disk is heated by near-field light radiated from the plasmon-generator and a magnetic field is applied to magnetic grains with reduced coercive force, a magnetization is reversed and a signal (information) is recorded. Therefore, the thermal gradient of the recording layer of the magnetic disk is a parameter to judge if a steep temperature change (increase or decrease) of the recording layer is possible or not. With a thermally-assisted magnetic disk device provided with a magnetic disk with a steeper thermal gradient, magnetization reversal can steeply occur. Therefore, a length (bit length) of the recording bit in the track traveling direction can be set to be small, and higher recording density can be realized.

In order to obtain a thermal gradient, in two heating conditions, the above-described distances EW1 and EW2 are obtained. The two heating conditions are a first heating condition HC1 where a temperature T1 of the first heating point $H_1$ and the second heating point $H_2$ in the recording layer of the magnetic disk is a predetermined temperature (temperature in excess of the Curie temperature Tc of a magnetic material configuring the magnetic grains of the recording layer) and a second heating condition HC2 where a temperature T2 of the first heating point $H_1$ and the second heating point $H_2$ in the recording layer of the magnetic disk is higher than the temperature T1 of the first heating condition HC1. Note, in the first heating condition HC1 and the second heating condition HC2, the temperatures T1 and T2 of the first heating point $H_1$ and the second heating point $H_2$ in the recording layer can be set to be predetermined temperatures by a control of the operating current (Iop) applied to the laser diode as described above.

A difference between the temperature T1 in the first heating condition HC1 and the temperature T2 in the second heating condition HC2 is not particularly limited. In the present embodiment, as described below, because a thermal gradient is obtained based on a difference between the maximum distances EW1 and EW2 in the respective heating conditions (first heating condition HC1 and second heating condition HC2), it is preferred to set a difference between the temperatures T1 and T2 in the respective heating conditions (first heating condition HC1 and second heating condition HC2) such that the difference between the maximum distances EW1 and EW2 is not affected by a measurement error.

Figure 5A:
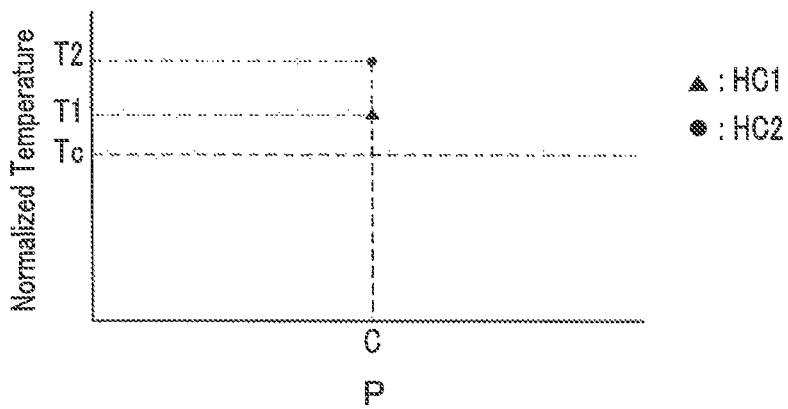
FIGS. 5A-5C are views that illustrate a process for making a graph illustrating a temperature distribution in the recording layer of the magnetic disk in the thermally-assisted magnetic disk that is a characterization evaluation target according to the embodiment of the present invention.
Figure 5B:
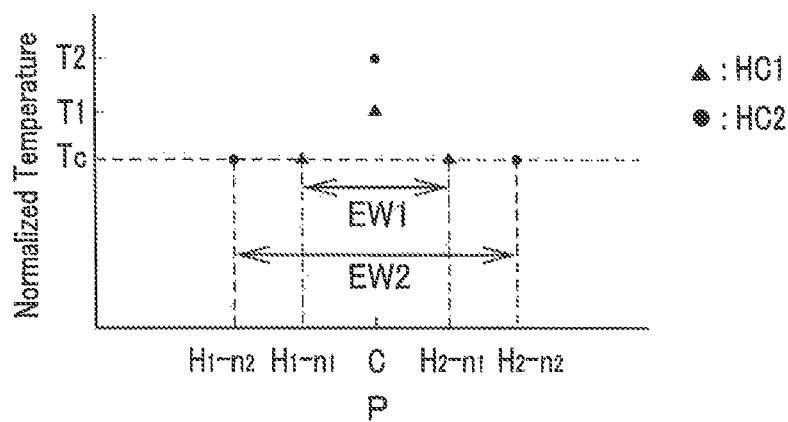

Next, based on the above-described maximum distances EW1 and EW2, a temperature profile is generated that shows a temperature dispersion in the recording layer of the magnetic disk when a reference signal recorded in the magnetic disk in the heating conditions (first heating condition HC1 and second heating condition HC2) is erased due to the effect of heat. Specifically, in graphs, the horizontal axis indicates the position P in the magnetic disk surface along the track width direction (cross track direction), and the vertical axis indicates the temperature (normalized temperature) in the recording layer of the magnetic disk. When the temperatures T1 and T2 in the respective heating conditions (first heating condition HC1 and second heating condition HC2) are plotted as temperatures of the track width center point C of the recording layer (see FIG. 5A), both a temperature of a first heating point $H_{1-n1}$ and a second heating point $H_{2-n1}$ in the recording layer in the case of the above-described maximum distance EW1 and a temperature of a first heating point $H_{1-n2}$ and a second heating point $H_{2-n2}$ in the recording layer in the case of the above-described maximum distance EW2 can be regarded as a Curie temperature (Tc) of a magnetic material configuring the magnetic grains of the recording layer. Therefore, the Curie temperature (Tc) can be plotted as the temperatures of the first heating points $H_{1-n1}$ and $H_{1-n2}$ and the second heating points $H_{2-n1}$ and $H_{2-n2}$ of the recording layer (see FIG. 5B).

A reason why the temperatures can be plotted as described above will be explained.

Figure 6A:
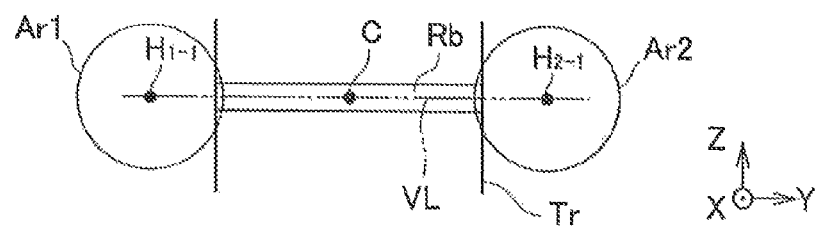
FIGS. 6A-6B are plan views of the magnetic disk schematically illustrating the relationship between the maximum distance between two heating points when a reference signal is erased and the predetermined temperature region (temperature region exceeding a Curie temperature of magnetic grains) having a heating point as its center.
Figure 6B:
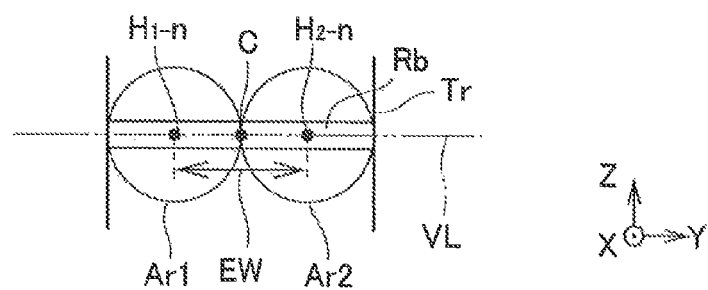

As illustrated in FIG. 6A, in the first heating step (see FIG. 1B), on a virtual line VL along the track width direction (cross track direction) that passes through the track width center point C of the recording bit Rb where a reference signal is recorded, the first heating point $H_{1-1}$ and the second heating point $H_{2-1}$ are set, and near-field light is radiated on both the first heating point $H_{1-1}$ and the second heating point $H_{2-1}$. At this time, because it is assumed that light spots of the near-field light radiated on the first heating point $H_{1-1}$ and the second heating point $H_{2-1}$ are a completely circular shape, the near-field light shows light intensity distributions in a concentric shape having the first heating point $H_{1-1}$ and the second heating point $H_{2-1}$ as their centers. Therefore, similarly also in the recording layer of the magnetic disk, temperature distributions that are concentric about the first heating point $H_{1-1}$ and the second heating point $H_{2-1}$ are formed. Note, in FIGS. 6A-6B, regions Ar1 and Ar2 on the magnetic disk that have temperatures of a Curie temperature (Tc) or higher at the time of heating of the heating points (first heating points $H_{1-1}$–$H_{1-n}$ and second heating points $H_{2-1}$–$H_{2-n}$) are illustrated as circles respectively having the heating points (first heating points $H_{1-1}$–$H_{1-n}$ and second heating points $H_{2-1}$–$H_{2-n}$) at their centers.

Because in the first heating step (see FIG. 1B) the regions Ar1 and Ar2 respectively having the heating points (first heating point $H_{1-1}$ and second heating point $H_{2-1}$) at their centers may slightly overlap with both sides in the track width direction (cross track direction) of the recording bit Rb where a reference signal is recorded (see FIG. 6A) or may not overlap with the recording bit Rb, demagnetization does not occur in all magnetic grains that form the recording bit Rb, and reproduction output intensity of a reference signal after heating does not become approximately zero.

Then, because in the n-th heating step (see FIG. 1D), the regions Ar1 and Ar2 respectively having the heating points (first heating point $H_{1-n}$ and second heating point $H_{2-n}$) at their centers overlap with the recording bit Rb and both of the regions Ar1 and Ar2 contact each other, a reference signal is erased due to heating of the first heating point $H_{1-n}$ and the second heating point $H_{2-n}$, and reproduction output intensity of the reference signal after heating becomes approximately zero. At this time, the distance (maximum distance EW) between the heating points (first heating point $H_{1-n}$ and second heating point $H_{2-n}$) becomes substantially the same as each of the diameters of the circular regions Ar1 and Ar2 that respectively have the heating points (first heating point $H_{1-n}$ and second heating point $H_{2-n}$) as their centers and have temperatures of the Curie temperature (Tc) or more in the recording layer of the magnetic disk. In other words, when a center of a light spot of near-field light radiated on the magnetic disk from the plasmon-generator of the magnetic head in the thermally-assisted magnetic disk device that is a characterization evaluation target coincides with the track width center point C of the recording bit Rb and the near-field light is radiated on the magnetic disk, the diameters of the circular regions that have a temperature of a Curie temperature or higher in the recording layer of the magnetic disk can be regarded as the maximum distance EW (EW1, EW2) obtained in each of the heating conditions (first heating condition, second heating condition).

Then, in the present embodiment, when near-field light radiated on the magnetic disk is absorbed, energy of the near-field light is converted to heat and the recording layer of the magnetic disk is heated. However, the near-field light shows a light intensity distribution called as Gaussian distribution, and a temperature distribution due to the absorption of the near-field light in the recording layer of the magnetic disk also shows Gaussian distribution. Therefore, by plotting the track width center point C and temperatures in the recording layer at the first heating point $H_{1-n}$ and the second heating point $H_{2-n}$ as described in FIG. 5B, a temperature profile can be generated that shows a temperature distribution in the recording layer of the magnetic disk when a signal recorded in the magnetic disk is erased due to the effect of heat in each of the heating conditions (first heating condition HC1 and second heating condition HC2) (see FIG. 5C).

Figure 5C:
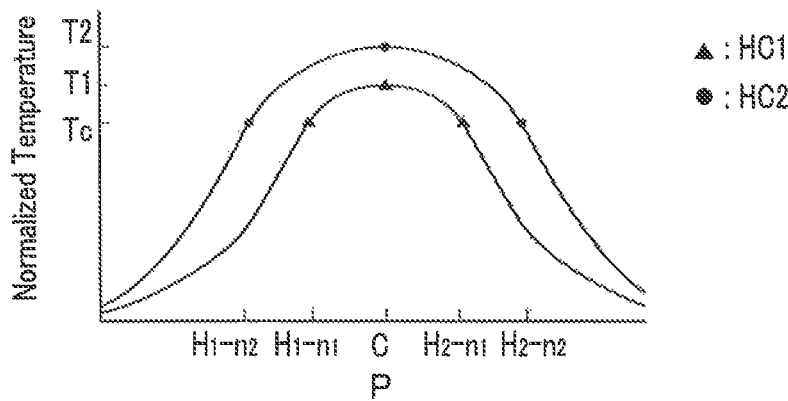

Based on the temperature profile generated as described above, a thermal gradient of the magnetic disk (recording layer) in the thermally-assisted magnetic disk device is obtained. At this point, based on the temperature profile in the two heating conditions (first heating condition HC1 and second heating condition HC2) as illustrated in FIG. 5C, thermal gradient for a Curie temperature (Tc) of the magnetic disk (recording layer) is obtained. During actual recording using the thermally-assisted magnetic disk device that is a characterization evaluation target, near-field light is radiated on the magnetic disk, a recording magnetic field is applied under a state where coercive force of magnetic grains configuring the recording layer of the magnetic disk is reduced, and thereby magnetizations of the magnetic grains are reversed. In other words, when information is recorded in the magnetic disk, a temperature of magnetic grains configuring the recording layer of the magnetic disk radiated with near-field light are extremely close to the Curie temperature (Tc). Therefore, the thermal gradient for the Curie temperature (Tc) obtained as described above shows a value that is extremely close to a thermal gradient of the magnetic disk (recording layer) during actual recording using the thermally-assisted magnetic disk that is a characterization evaluation target, and functions as an indicator for characterization evaluation of the thermally-assisted magnetic disk device.

Figure 5D:
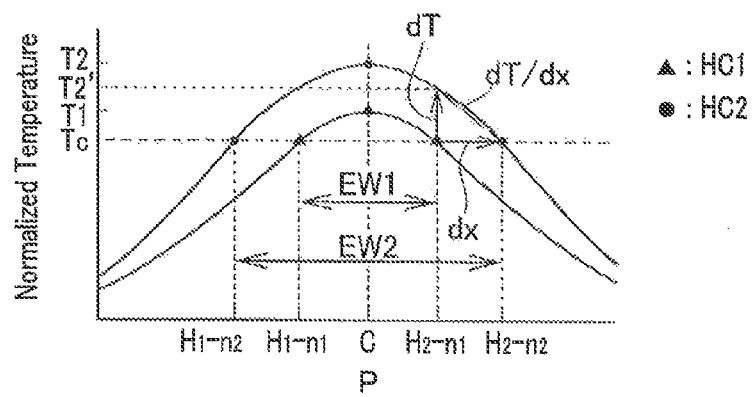
FIG. 5D is a view that explains a process for obtaining a thermal gradient based on the graph illustrating the temperature distribution.

Here, as is obvious from the temperature profile illustrated in FIG. 5D, the thermal gradient (dT/dx) for the Curie temperature (Tc) is obtained from the following expressions (1)-(3).

$$dT = T2' - Tc \quad (1)$$

$$dx = (EW2 - EW1)/2 \quad (2)$$

$$dT/dx = 2(T2' - Tc)/(EW2 - EW1) \quad (3)$$

In the expressions (1) and (3), T2' means under the generated temperature profile (see FIG. 5C), a temperature of a position (second heating point $H_{2n-1}$ (or first heating point $H_{1-n1}$) in the n-th heating step) on the magnetic disk heated in the first heating condition to have the Curie temperature (Tc) when heating is performed in the second heating condition (see FIG. 5D).

Here, because as described above the temperature distribution of the magnetic disk in each of the heating conditions (first heating condition, second heating condition) is shown by Gaussian distribution, it is understood that the following expression (4) is established.

$$T2:T1 = T2':Tc \quad (4)$$

Therefore, based on the above-described expressions (3) and (4), the thermal gradient (dT/dx) for the Curie temperature (Tc) is obtained from the following expression (5).

$$dT/dx = 2(T2 \times Tc/T1 - 2Tc)/(EW2 - EW1) \quad (5)$$

Note, the thermal gradient (dT/dx) obtained as described above is a thermal gradient in the track width direction (cross track direction). And as described above, a light intensity distribution of near-field light radiated on the magnetic disk in the thermally-assisted magnetic disk device is shown to be in a concentric shape, and the temperature distribution of the recording layer of the magnetic disk is also shown to be in a concentric shape in the same manner. Therefore, it can be assumed that the superiority (largeness) of the thermal gradients in the track width direction (cross track direction) obtained respectively for a plurality of the thermally-assisted magnetic disk devices having at least the magnetic heads of the same configuration is substantially the same as the superiority (largeness) of the thermal gradients in the track traveling direction (down track direction) for the thermally-assisted magnetic disk devices.

Therefore, because the thermally-assisted magnetic disk device having the larger thermal gradient (dT/dx), which is obtained as described above, can get the steeper magnetization reversal, a bit length of a recording bit where a signal is recorded in the magnetic disk can be shortened. Therefore, such thermally-assisted magnetic disk device can be evaluated as a device that allows high recording density to be realized.

Also, because a magnetic recording width of a signal in the magnetic disk can be decreased, a thermally-assisted magnetic disk device with a large thermal gradient (dT/dx) in the track width direction, which is obtained as described above, can be also evaluated as a device that has an excellent characteristic in a magnetic effect between adjacent tracks and heat fluctuation, etc.

Note, in the above-described embodiment, the thermal gradients are obtained from the maximum distances EW in the two heating conditions. However, it is also possible to obtain the thermal gradient from a maximum distance EW in one heating condition.

<Characteristic Evaluation by Temperature Distribution of Recording Layer of Magnetic Disk>

Based on the maximum distance EW obtained as described above, a temperature distribution in the recording layer of the magnetic disk in the thermally-assisted magnetic disk device is obtained. In the thermally-assisted magnetic disk device, a temperature distribution in the recording layer of the magnetic disk shows a shape similar to a shape of a light spot of near-field light radiated from the plasmon-generator. And, the light spot shape of near-field light depends on a shape of the plasmon-generator that generates the near-field light. Normally, in a magnetic head of a thermally-assisted magnetic disk device, a shape of a plasmon-generator is designed such that a light spot shape of near-field light becomes a substantially circular shape, and the magnetic head (Plasmon-Generator) is made. Therefore, it becomes possible to evaluate errors in shape upon the design of the plasmon-generator or sequential errors in shape by precisely determining the temperature distribution of the magnetic disk (recording layer).

In order to obtain the temperature distribution, the above-described maximum distances EW1 and EW2 are respectively obtained in two heating conditions of a first heating condition HC1 and a second heating condition HC2. With the first heating condition HC1, a temperature T1 of the first heating point $H_1$ and the second heating point $H_2$ in the recording layer of the magnetic disk becomes a predetermined temperature (a temperature slightly exceeding a Curie temperature Tc of a magnetic material configuring magnetic grains of the recording layer of the magnetic disk (for example, the Curie temperature Tc+10K or more or less). With the second heating condition HC2, a temperature T2 of the first heating point $H_1$ and the second heating point $H_2$ in the recording layer of the magnetic disk becomes a temperature higher than the temperature T1 in the first heating condition HC1. Note, in the first heating condition HC1 and the second heating condition HC2, as described above, the temperatures T1 and T2 of the first heating point $H_1$ and the second heating point $H_2$ in the recording layer can be set to be predetermined temperatures by a control of an operating current (Iop) applied to the laser diode.

Figure 7A:
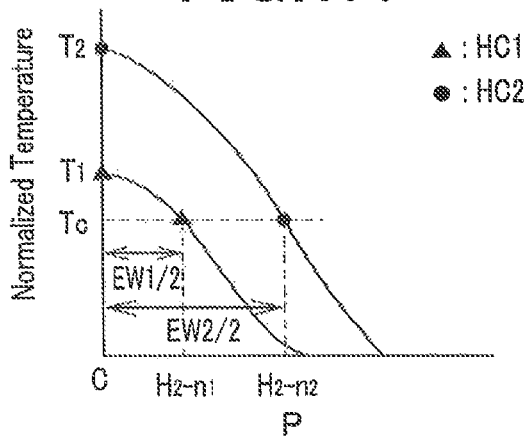
FIGS. 7A-7C are views that illustrate a process for making a graph illustrating a detail of a temperature distribution in the recording layer of the magnetic disk during recording by the thermally-assisted magnetic disk device that is the characterization evaluation target according to the embodiment of the present invention.

Next, from the obtained maximum distances EW1 and EW2, and temperatures of the first heating points $H_{1-n1}$ and $H_{1-n2}$ and the second heating points $H_{2-n1}$ and $H_{2-n2}$ in the recording layer of the magnetic disk, a graph illustrating a relationship between the position P on the magnetic disk and the temperature in the recording layer in each of the heating conditions is made (see FIG. 7A). As described above, when the temperatures T1 and T2 in the heating conditions (first heating condition HC1 and second heating condition HC2) are set to be a temperature in the track width center point C in the recording layer, both a temperature at the second heating point $H_{2-n1}$ (first heating point $H_{1-n1}$) in the recording layer for the above-described maximum distance EW1 and a temperature at the second heating point $H_{2-n2}$ (first heating point $H_{1-n2}$) in the recording layer for the above-described maximum distance EW2 are regarded as being the Curie temperature (Tc) of a magnetic material configuring magnetic grains in the recording layer. Therefore, the Curie temperature (Tc) can be regarded as temperatures in the first heating points $H_{1-n1}$ and $H_{1-n2}$ and the second heating points $H_{2-n1}$ and $H_{2-n2}$ in the recording layer. Therefore, a graph as illustrated in FIG. 7A can be made.

Figure 7B:
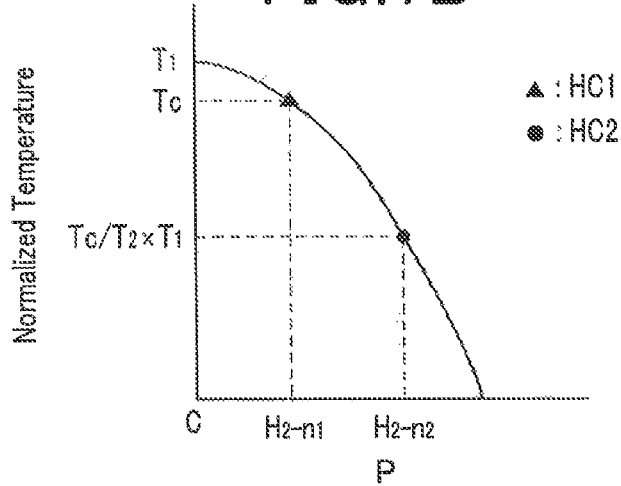

A graph (see FIG. 7A) made as described above is illustrated by Gaussian distribution as described above. Therefore, based on the graph, when a temperature in the track width center point in the recording layer is the temperature T1 in the first heating point $H_{1-n1}$ and the second heating point $H_{2-n1}$ in the recording layer in the first heating condition HC1, a graph illustrating a temperature distribution in the recording layer of the magnetic disk during recording by the thermally-assisted magnetic disk device can be made (see FIG. 7B).

Figure 7C:
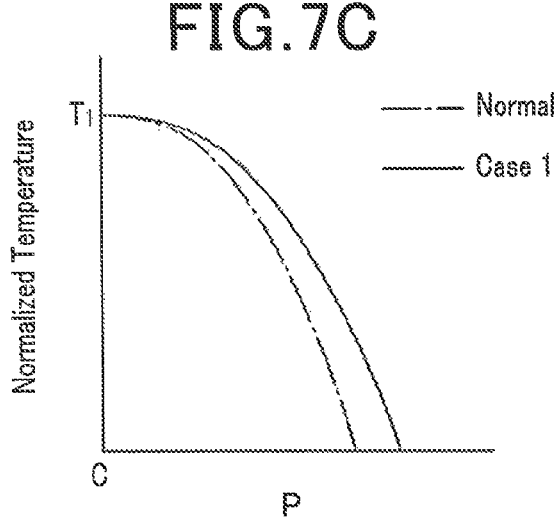

By making the graph illustrating the temperature distribution (temperature distribution in the track width direction) in the recording layer of the magnetic disk during recording by the thermally-assisted magnetic disk device as described above, the presence of errors in shape of the plasmon-generator, etc. can be visually judged and evaluated. For example, when the graph illustrating the temperature distribution, which is made as described above, has distortions, the light spot shape of near-field light can be evaluated as having an error. Therefore, an error in shape of the plasmon-generator can be assumed. FIG. 7C is a graph that illustrates temperature distributions of one case example (Case 1, solid line) where the light spot shape of near-field light has an error and a case without an error (Normal, dot-dash line). From this graph, when the light spot shape has an error (Case 1), it is obvious that a temperature in a position distant from the track width center point C in the track width direction is higher as compared to a temperature when the light spot shape has no error (Normal). Therefore, in the thermally-assisted magnetic disk device in Case 1, the light spot shape can be judged to be widened in the track width direction. As described above, according to the present embodiment, by making the graph illustrating the temperature distributions as described above, the presence of an error in the light spot shape of near-field light, that is, the presence of an error in shape of the plasmon-generator can be visually judged and evaluated.

Note, in the above-described embodiment, a temperature distribution in the recording layer of the magnetic disk during recording by the thermally-assisted magnetic disk device is obtained by obtaining the maximum distances EW in the two heating conditions. However, it is also possible either to obtain the temperature distribution by obtaining a maximum distance EW in one heating condition, or to obtain the temperature distribution by determining maximum distances EW in three or more heating conditions. It is needless to say that, by increasing the number of heating conditions, the temperature distribution can be further precisely obtained and the presence of an error in shape of the plasmon-generator can be precisely evaluated.

<Evaluation of Effects of Magnetic Field and Heat with Respect to Magnetic Recording Width>

Even when thermally-assisted magnetic disk devices are made by combining the same type of magnetic disks and magnetic heads made under the same design, and even when information (signal) is recorded by using the thermally-assisted magnetic disk devices in one lot in a condition that allows to have the same recording characteristics (SNR, bit error rate (BER)), some of the thermally-assisted magnetic disk devices may have errors in a magnetic recording width (MWW) of signals recorded in recording bits in the magnetic disks. The magnetic recording width (MWW) in the thermally-assisted magnetic disk device may be affected not only by the recording magnetic field intensity applied from the magnetic pole to the magnetic disk but also by heat generated from near-field light radiated from the plasmon-generator. In other words, based on the balance between the size of a region (magnetic field application region) on the magnetic disk to which an intensity of a magnetic field that allows the magnetizations of the magnetic grains to be reversed is applied and the size of a region (heating region) on the magnetic disk to which an amount of heat that allows coercive force of the magnetic grains to be reduced is applied, the magnetic recording width (MWW) is determined. Therefore, when an error in the above-described magnetic recording width (MWW) occurs, it is needed to judge whether a primary reason of the error occurrence is due to a recording magnetic field or due to heat.

In such case, it can be judged and evaluated, based on the maximum distance EW obtained as described above, whether an error in the magnetic recording width (MWW) is caused due to an effect of a recording magnetic field applied from the magnetic pole or due to an effect of near-field light (that is, heat) radiated from the plasmon-generator.

Specifically, for the thermally-assisted magnetic disk device, which is an evaluation target, having an error in the magnetic recording width (MWW), a maximum distance EW is obtained by the above-described method. Simultaneously with this, for the thermally-assisted magnetic disk device having no error in the magnetic recording width (MWW), a maximum distance EW is obtained by the same method.

Then, by comparing both of the maximum distances EW, a primary reason that causes an error in the magnetic recording width (MWW) is judged and evaluated.

For example, as illustrated in Table. 1, in a case of no error in the magnetic recording width (MWW), the magnetic recording width (MWW) for the thermally-assisted magnetic disk device was set to be 60 nm, and the obtained maximum distance EW was 40 nm (Normal). On the other hand, for the thermally-assisted magnetic disk device having an error in the magnetic recording width (MWW), the magnetic recording widths (MWW) were set to be 100 nm, and the obtained maximum distances EW were respectively 40 nm and 80 nm (Case 1, Case 2).

TABLE 1

|  | MWW(nm) | EW(nm) | Delta(nm) |
|---|---|---|---|
| Normal | 60 | 40 | 20 |
| Case 1 | 100 | 40 | 60 |
| Case 2 | 100 | 80 | 20 |

In a case of the thermally-assisted magnetic disk device of Case 1, a heating region on the magnetic disk made by irradiation of near-field light from the plasmon-generator (region in the recording layer of the magnetic disk of which a temperature becomes the Curie temperature (Tc) or more) is assumed to be substantially the same as a heating region of the thermally-assisted magnetic disk device of Normal. Therefore, in the thermally-assisted magnetic disk device of Case 1, an effect that is caused by heat due to near-field light radiated from the plasmon-generator and that affects magnetization reversal of magnetic grains is judged and evaluated to be substantially the same as that in the thermally-assisted magnetic disk device of Normal. It can be evaluated that, in comparison with the thermally-assisted magnetic disk device of Normal, an error in the magnetic recording width (MWW) occurs because a recording magnetic field applied to the magnetic disk from the magnetic pole was too intense.

On the other hand, in a case of the thermally-assisted magnetic disk device of Case 2, a heating region on the magnetic disk by irradiation of near-field light from the plasmon-generator (region in the recording layer of the magnetic disk of which a temperature becomes the Curie temperature (Tc) or more) is assumed to be wider than a heating region of the thermally-assisted magnetic disk device of Normal. Therefore, in the thermally-assisted magnetic disk device of Case 2, it can be judged and evaluated that at least an effect of heat that is given to magnetization reversal of magnetic grains is different from that in the thermally-assisted magnetic disk device of Normal. It can be evaluated that the larger heating region on the magnetic disk in comparison with the thermally-assisted magnetic disk device of Normal is one of the reasons that cause an error in the magnetic recording width (MWW).

As described above, by the characterization evaluation method according the present embodiment, a characterization of the thermally-assisted magnetic disk device can be precisely evaluated. Next, one example of a specific configuration of the thermally-assisted magnetic disk device that is a characteristic evaluation target in the present embodiment is explained.

Figure 8:
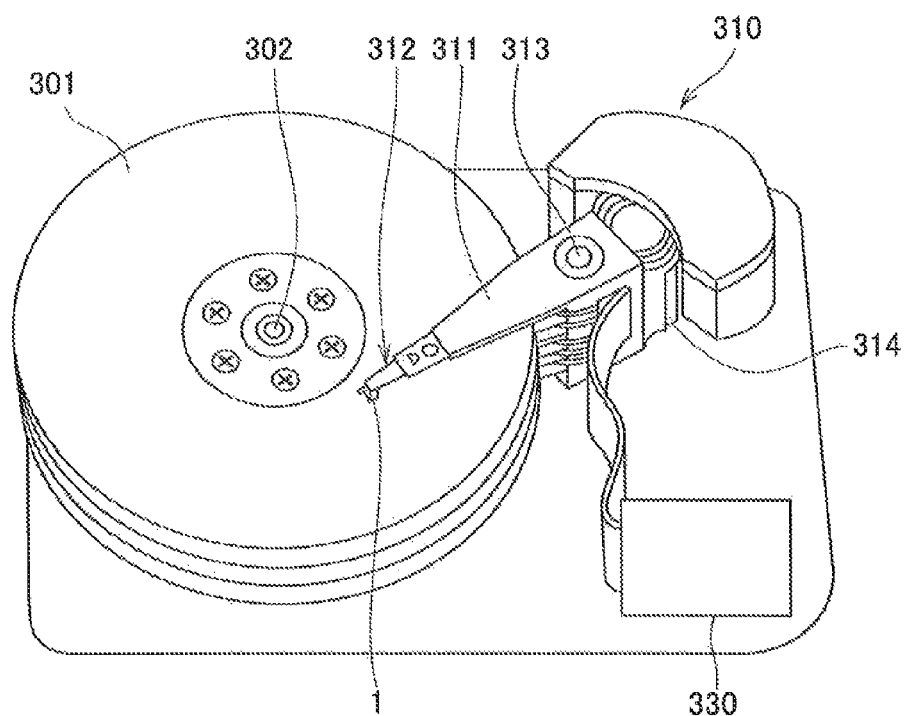
FIG. 8 is a perspective view that schematically illustrates a configuration (one example) of the thermally-assisted magnetic disk device that is a characteristic evaluation target according to the embodiment of the present invention.
Figure 9:
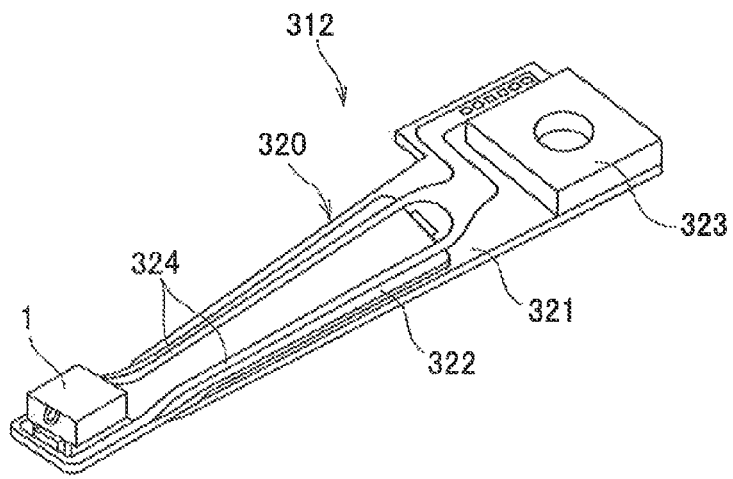
FIG. 9 is a perspective view schematically illustrating a head gimbal assembly (HGA) according to the embodiment of the present invention.
Figure 10:
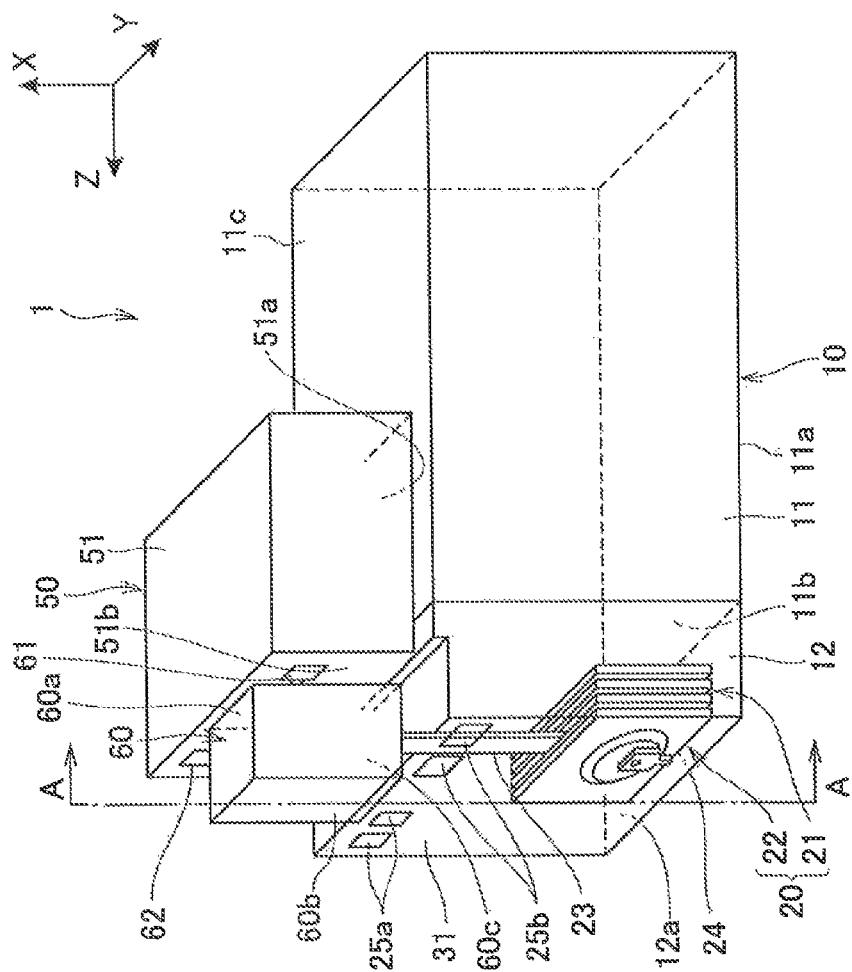
FIG. 10 is a perspective view illustrating a magnetic head according to the embodiment of the present invention.

FIG. 8 is a perspective view schematically illustrating an example of a thermally-assisted magnetic disk device in the present embodiment. FIG. 9 is a perspective view schematically illustrating a head gimbal assembly (HGA) in the thermally-assisted magnetic disk device. FIG. 10 is a perspective view illustrating a magnetic head in the thermally-assisted magnetic disk device.

As illustrated in FIG. 8, the thermally-assisted magnetic disk device that is a characterization evaluation target in the present embodiment is provided with a plurality of magnetic disks 301 that rotate about a rotation axis of a spindle motor 302, an assembly carriage device 310 on which a plurality of drive arms 311 are provided, a head gimbal assembly (HGA) 312 that is attached on a front end portion of each of the drive arms 311 and has a magnetic head 1 that is a thin film magnetic head, and a control circuit 330 for controlling the write and read operations of the magnetic head 1 and the light emission operation of the laser diode that is a light source emitting laser light used in thermally-assisted magnetic recording (to be described later).

The assembly carriage device 310 is a device for positioning the magnetic head 1 on a track that is formed on the magnetic disk 301 and on which recording bits are arrayed. In the assembly carriage device 310, the drive arms 311 are stacked in a direction along a pivot bearing shaft 313, and are angularly swingable about the pivot bearing shaft 313 by a voice coil motor (VCM) 314.

The structure of the thermally-assisted magnetic disk device in the present embodiment is not limited to the structure described above, and may include only one magnetic disk 301, one drive arm 311, one HGA 312, and one magnetic head 1.

In the HGA 312 illustrated in FIG. 9, a suspension 320 includes a load beam 321, a flexure 322 that is fixed on the load beam 321 and has elasticity, and a base plate 323 provided on a base portion of the load beam 321. Further, on the flexure 322, a wiring member 324 configured with a lead conductor and connection pads electrically connected to both ends of the lead conductor is provided. The magnetic head 1 in the present embodiment is fixed on the flexure 322 at a front end portion of the suspension 320 such that the magnetic head 1 opposes a surface of each magnetic disk 301 with a predetermined gap (flying height). Further, one end of the wiring member 324 is electrically connected to a terminal electrode of the magnetic head 1 in the present embodiment.

As illustrated in FIG. 10, the magnetic head 1 in the present embodiment includes a slider 10 and a light source unit 50. The slider 10 is formed from ALTIC ($Al_2O_3$—TiC) and the like, and is provided with a slider substrate 11 having an air bearing surface (ABS) 11a as a medium opposing surface that is processed to gain a proper flying height, and a head part 12 formed on an element formation surface 11b that is perpendicular to the ABS 11a.

Further, the light source unit 50 is formed from ALTIC ($Al_2O_3$—TiC) and the like, and is provided with a unit substrate 51 having a joining surface 51a, and a laser diode 60 as a light source provided on a light source installation surface 51b that is perpendicular to the joining surface 51a.

Here, the slider 10 and the light source unit 50 are joined with each other by joining a back surface 11c of the slider substrate 11 and the joining surface 51a of the unit substrate 51. The back surface 11c of the slider substrate 11 means an end surface on an opposite side of the ABS 11a of the slider substrate 11. The magnetic head 1 in the present embodiment may also be configured to have the laser diode 60 directly mounted on the slider 10, without using the light source unit 50.

The head part 12 formed on the element formation surface 11b of the slider substrate 11 is provided with a head element 20 having an MR element 21 for reading out data from the magnetic disk 301 and an electromagnetic transducer element 22 for writing data to the magnetic disk 301, a waveguide 23 for guiding laser light from the laser diode 60 provided in the light source unit 50 to the air bearing surface side, a plasmon-generator 24 that, together with the waveguide 23, configures a near-field light generating optical system, a protective layer 31 formed on the element formation surface 11b in a manner covering the MR element 21, the electromagnetic transducer element 22, the waveguide 23 and the plasmon-generator 24, a pair of first terminal electrodes 25a that are exposed on an upper surface of the protective layer 31 and are electrically connected to the MR element 21, and a pair of second terminal electrodes 25b that are exposed on an upper surface of the protective layer 31 and are electrically connected to the electromagnetic transducer element 22. These first and second terminal electrodes 25a and 25b are electrically connected to the connection pads of the wiring member 324 provided on the flexure 322 (see FIG. 9).

One end of the MR element 21, one end of the electromagnetic transducer element 22 and one end of the plasmon-generator 24 respectively reach a head part end surface 12a that is an air bearing surface of the head part 12. Here, the head part end surface 12a and the ABS 11a form the entire air bearing surface of the magnetic head 1 in the present embodiment.

When actual reading or writing is performed, the magnetic head 1 hydrodynamically flies with a predetermined flying height on a surface of a rotating magnetic disk 301. In this case, end surfaces of the MR element 21 and the electromagnetic transducer element 22 oppose a surface of the magnetic recording layer of the magnetic disk 301 maintaining a suitable magnetic spacing therebetween. In this state, the MR element 21 performs reading by sensing a data signal magnetic field from the magnetic recording layer, and the electromagnetic transducer element 22 performs writing by applying a data signal magnetic field to the magnetic recording layer.

Here, when writing, the laser light propagated from the laser diode 60 of the light source unit 50 through the waveguide 23 couples with the plasmon-generator 24 in a surface plasmon mode and excites a surface plasmon in the plasmon-generator 24. The surface plasmon generates near-field light at an end portion on the head part end surface 12a side of the plasmon-generator 24 by propagating through a projection part 241 (see FIG. 12) of the plasmon-generator 24 (to be described later) toward the head part end surface 12a. The near-field light reaches the surface of the magnetic disk 301 and heats a magnetic recording layer portion of the magnetic disk 301, and thereby, the anisotropy magnetic field (coercive force) of that portion is reduced to a value that allows writing to be performed. By applying a recording magnetic field to the portion where the anisotropy magnetic field has been reduced, the thermally-assisted magnetic recording can be performed.

Figure 11:
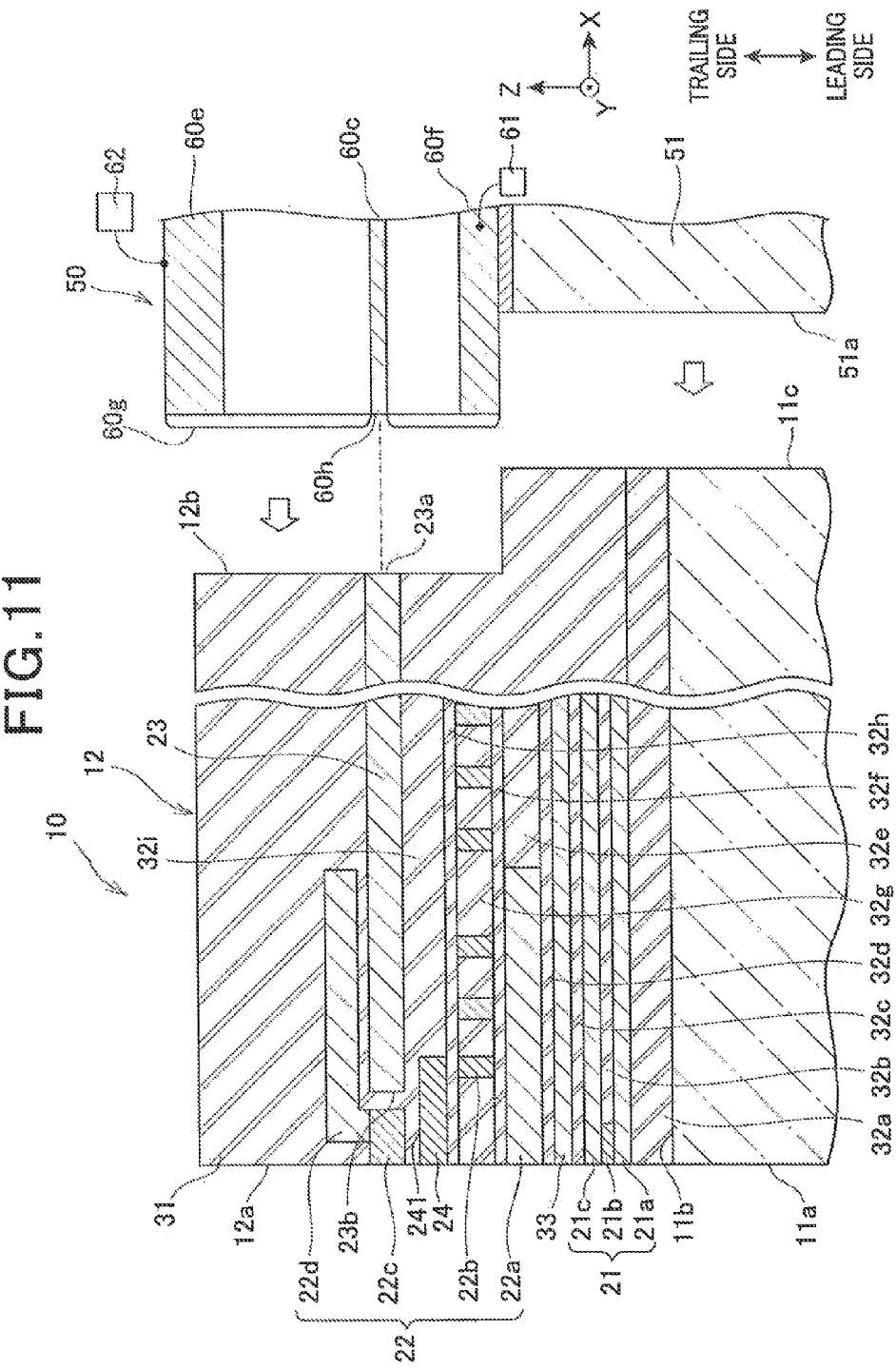
FIG. 11 is an A-A line cross-sectional view (XZ plane) in FIG. 10, and schematically illustrates a configuration of a main part of the magnetic head according to the embodiment of the present invention.

FIG. 11 schematically illustrates a configuration of the magnetic head 1 in the present embodiment and is a cross-sectional view along a line A-A in FIG. 10 (XZ plane).

As illustrated in FIG. 11, the MR element 21 has a lower shield layer 21a formed on a first insulating layer 32a on the element formation surface 11b of the slider substrate 11, a MR multilayer body 21b formed on the lower shield layer 21a, and an upper shield layer 21c formed on the MR multilayer body 21b. On the periphery of the MR multilayer body 21b, a second insulating layer 32b is provided between the lower shield layer 21a and the upper shield layer 21c.

The lower shield layer 21a and the upper shield layer 21c are, for example, magnetic layers having a thickness of about 0.5-3 μm formed by a frame platting method, a sputtering method, or the like, and are composed of, for example, a soft magnetic material such as NiFe (permalloy), FeSiAl (sendust), CoFeNi, CoFe, FeN, FeZrN, and CoZrTaCr, or a multilayer film of these materials.

The MR multilayer 21b is a magnetically sensitive part that senses a signal magnetic field using the MR effect, and, for example, may be any one of a current in plane-giant magnetoresistive (CIP-GMR) multilayer body that uses a current-in-plane giant magnetoresistive effect, a current perpendicular to plane-giant magnetoresistive (CPP-GMR) multilayer body that uses a current-perpendicular-to-plane giant magnetoresistive effect, and a tunnel-magnetoresistive (TMR) multilayer body that uses a tunnel magnetoresistive effect. When the MR multilayer body 21b is a CPP-GMR multilayer body or a TMR multilayer body, the lower shield layer 21a and the upper shield layer 21c also function as electrodes. On the other hand, when the MR multilayer body 21b is a CIP-GMR multilayer body, insulating layers are provided respectively between the MR multilayer body 21b and the lower shield layer 21a, and between the MR multilayer body 21b and the upper shield layer 21c, and an MR lead layer that is electrically connected to the MR multilayer body 21b is further provided.

When the MR multilayer body 21b is a TMR multilayer body, the MR multilayer body 21b has a structure in which an antiferromagnetic layer, a magnetization pinned layer, a tunnel barrier layer, and a magnetization free layer are sequentially laminated. The antiferromagnetic layer has a thickness of about 5-15 nm and is composed of, for example, IrMn, PtMn, NiMn, RuRhMn and the like. The magnetization pinned layer has a structure in which two ferromagnetic layers composed of, for example, CoFe and the like sandwich therebetween a nonmagnetic metal layer composed of Ru and the like, and has the magnetization direction pinned by the antiferromagnetic layer. The tunnel barrier layer is composed of a nonmagnetic dielectric material produced by oxidizing a metal film having a thickness of about 0.5-1 nm composed of, for example, Al, AlCu, Mg and the like by oxygen introduced into a vacuum device or by natural oxidation. The magnetization free layer is composed of a two-layer film of ferromagnetic materials including, for example, a layer of CoFe and the like having a thickness of about 1 nm and a layer of NiFe and the like having a thickness of about 3-4 nm, and forms tunnel exchange coupling with the magnetization pinned layer via the tunnel barrier layer.

The head part 12 in the present embodiment is provided with a third insulating layer 32c provided on the upper shield layer 21c, an interelement shield layer 33 provided on the third insulating layer 32c, and a fourth insulating layer 32d provided on the interelement shield layer 33. The interelement shield layer 33 may also be formed from a soft magnetic material, and has a function to shield the MR element 21 from a magnetic field generated by the electromagnetic transducer element 22 provided on the fourth insulating layer 32d. The third insulating layer 32c and the interelement shield layer 33 may be omitted.

The electromagnetic transducer element 22 is for perpendicular magnetic recording and is provided with a lower yoke layer 22a provided on the fourth insulating layer 32d, a writing coil 22b provided on the lower yoke layer 22a, a magnetic pole 22c that reaches the head part end surface 12a so as to form a portion of the head part end surface 12a above the writing coil 22b, an upper yoke layer 22d provided on the magnetic pole 22c, and two linkage parts 22e, 22e (see FIG. 12) that are provided on the lower yoke layer 22a in a manner sandwiching the waveguide 23 (to be described later) from both sides in the Y-axis direction (track width direction) and link the lower yoke layer 22a and the upper yoke layer 22d. The writing coil 22b has a spiral structure that winds the two linkage layers 22e and 22e (see FIG. 12) together so as to at least pass between the lower yoke layer 22a and the upper yoke layer 22d during one turn.

The head part 12 in the present embodiment is provided with a fifth insulating layer 32e provided around the lower yoke layer 22a on the fourth insulating layer 32d, a sixth insulating layer 32f provided on the lower yoke layer 22a and the fifth insulating layer 32e, a seventh insulating layer 32g provided between the windings of the writing coil 22b and around the writing coil 22b, an eighth insulating layer 32h provided on the writing coil 22b and the seventh insulating layer 32g, and a ninth insulating layer 32i provided around the plasmon-generator 24 (to be described later) on the eighth insulating layer 32h.

In the head part 12 in the present embodiment, the lower yoke layer 22a, the linkage layers 22e, the upper yoke layer 22d, and the magnetic pole 22c form a magnetic guide path that allows the passage of magnetic flux corresponding to the magnetic field generated by the writing coil 22b and guides the magnetic flux to the magnetic recording layer (perpendicular magnetization layer) of the magnetic disk 301. The most leading side of the end surface of the magnetic pole 22c that forms a portion of the head part end surface 12a becomes a point that generates a recording magnetic field.

It is preferable that the magnetic pole 22c be formed from a soft magnetic material having a saturation magnetic flux density higher than the upper yoke layer 22d. For example, the magnetic pole 22c is formed from a soft magnetic material that is an iron-based alloy material containing Fe as a main component, such as FeNi, FeCo, FeCoNi, FeN, or FeZrN.

The end surface on the head part end surface 12a side of the upper yoke layer 22d is located on the head part rear end surface 12b side a predetermined length deep from the head part end surface 12a along the X-axis direction without reaching the head part end surface 12a. This allows the magnetic flux to be concentrated on the magnetic pole 22c and the intensity of the magnetic field generated by the magnetic pole 22c to be enhanced.

The writing coil 22b is formed from, for example, a conductive material such as Cu (copper). The writing coil 22b in the present embodiment has one layer. However, the writing coil 22b may also have two or more layers, and may also be a helical coil arranged in a manner sandwiching the upper yoke layer 22d therebetween. Further, the number of turns of the writing coil 22b is not particularly limited. For example, the number of turns of the writing coil 22b may be configured to be 2-7 turns.

The lower yoke layer 22a is formed on the fourth insulating layer 32d that is composed of an insulating material such as $Al_2O_3$ (alumina), and functions as a magnetic guide path guiding the magnetic flux returned from the soft magnetic under layer provided under the magnetic recording layer (perpendicular magnetization layer) of the magnetic disk 301. The lower yoke layer 22a is composed of a soft magnetic material.

As viewed from the ABS 11a (head part end surface 12a), the waveguide 23 is provided at a location deeper than the magnetic pole 22c in the X-axis direction (height direction). The plasmon-generator 24 is provided below (on the leading side of) the magnetic pole 22c. The waveguide 23 and the plasmon-generator 24 form an optical system for near-field light generation in the head part 12.

The waveguide 23 extends parallel to the element formation surface 11b from a rear end surface 23a that forms a portion of the head part rear end surface 12b toward a rear end surface of the magnetic pole 22c such that a predetermined gap is maintained between the waveguide 23 and the rear end surface of the magnetic pole 22c so as to avoid contacting the magnetic pole 22c. Further, the lower surface (a portion of a side surface) of the waveguide 23 and a portion of the projection part 241 of the plasmon-generator 24 oppose each other with a predetermined gap, and the portion that is sandwiched thereby forms a buffer portion 40 having a refractive index lower than the refractive index of the waveguide 23.

The buffer portion 40 functions to cause the laser light propagating though the waveguide 23 to couple with the plasmon-generator 24 in a surface plasmon mode. The buffer portion 40 may be a portion of the ninth insulating layer 32i, and may also be a new layer provided separately from the ninth insulating layer 32i.

The plasmon-generator 24 is provided so that the projection part 241 respectively opposes the magnetic pole 22c and the waveguide 23. Specific configurations of the magnetic pole 22c, the waveguide 23 and the plasmon-generator 24 will be described later.

As illustrated in FIG. 11, the light source unit 50 is provided with the unit substrate 51, the laser diode 60 provided on the light source installation surface 51b of the unit substrate 51, a first drive terminal electrode 61 electrically connected to an electrode 60f that forms the lower surface of the laser diode 60, and a second drive terminal electrode 62 electrically connected to an electrode 60e that forms the upper surface of the laser diode 60. The first and second drive terminal electrodes 61 and 62 are electrically connected to the connection pads of the wiring member 324 provided on the flexure 322 (see FIG. 9). When a predetermined voltage is applied to the laser diode 60 via the first and second drive terminal electrodes 61 and 62, laser light is emitted from a light emission center 60h located on a light emission surface of the laser diode 60. Here, in the head structure as illustrated in FIG. 11, it is preferable that the oscillation direction of the electric field of the laser light generated by the laser diode 60 be perpendicular to a lamination layer plane of an active layer 60d (Z-axis direction). That is, it is preferable that the laser light generated by the laser diode 60 be a polarization of a TM mode. This allows the laser light propagating through the waveguide 23 to suitably couple via the buffer portion 40 with the plasmon-generator 24 in a surface plasmon mode.

As the laser diode 60, those commonly used for communications, optical disk storage, material analysis, and the like, such as InP-based, GaAs-based, and GaN-based laser diodes, can be used. The wavelength $\lambda_L$ of the emitted laser light may be in the range of 375 nm-1.7 μm, for example.

Specifically, for example, an InGaAsP/InP-based quaternary mixed crystal laser diode having a possible wavelength range of 1.2-1.67 μm can be used. The laser diode 60 has a multilayer structure containing the upper electrode 60e, the active layer 60c, and the lower electrode 60f. Around a cleavage surface of this multilayer structure, a reflection layer is formed for exciting oscillation by total reflection. A reflection layer 60g is provided with an opening at the location of the active layer 60c that contains the light emission center 60h. Here, the laser diode 60 can have a thickness $T_{LA}$ of about 60-200 μm, for example.

Further, to drive the laser diode 60, a power source in the magnetic disk device can be used. In practice, the magnetic disk device is usually provided with a power source of about 5V, for example, and has a voltage that is sufficient for laser oscillation operation. Further, power consumption of the laser diode 60 is, for example, about several tens of mW, which can be sufficiently covered by the power source in the magnetic disk device. In practice, a predetermined voltage is applied by this power source between the first drive terminal electrode 61 that is electrically connected to the lower electrode 60f and the second drive terminal electrode 62 that is electrically connected to the upper electrode 60e, and by causing the laser diode 60 to oscillate, laser light is emitted from the opening of the reflection layer 60g that contains the light emission center 60h. The laser diode 60 and the first and second drive terminal electrodes 61 and 62 are not intended to be limited by the embodiment described above. For example, in the laser diode 60, it is also possible to reverse up and down of the electrodes and join the upper electrode 60e to the light source installation surface 51b of the unit substrate 51. Further, it is also possible to install a laser diode on the element formation surface 11b of the magnetic head 1, and optically connect the laser diode and the waveguide 23. Further, without being provided with the laser diode 60, the magnetic head 1 may be connected, for example, via an optical fiber and the like, to a light emission center of a laser diode provided in the magnetic disk device and the rear end surface 23a of the waveguide 23.

The sizes of the slider 10 and the light source unit 50 are arbitrary. For example, the slider 10 may be a so-called femto slider having a width in the track width direction (Y-axis direction) of 700 μm×a length (in the Z-axis direction) of 850 μm×a thickness (in the X-axis direction) of 230 μm. In this case, the light source unit 50 may have a size slightly smaller than that of the slider 10, for example, a width in the track width direction of 425 μm×a length of 300 μm×a thickness of 300 μm.

The magnetic head 1 is configured by connecting the light source unit 50 and the slider 10 described above. In connecting the light source unit 50 and the slider 10, the joining surface 51a of the unit substrate 51 and the back surface 11c of the slider substrate 11 are joined. However, in this case, the positions of the unit substrate 51 and the slider substrate 11 are determined such that the laser light generated from the laser diode 60 is incident on the rear end surface 23a on the side opposite to the ABS 11a at the waveguide 23.

Figure 12:
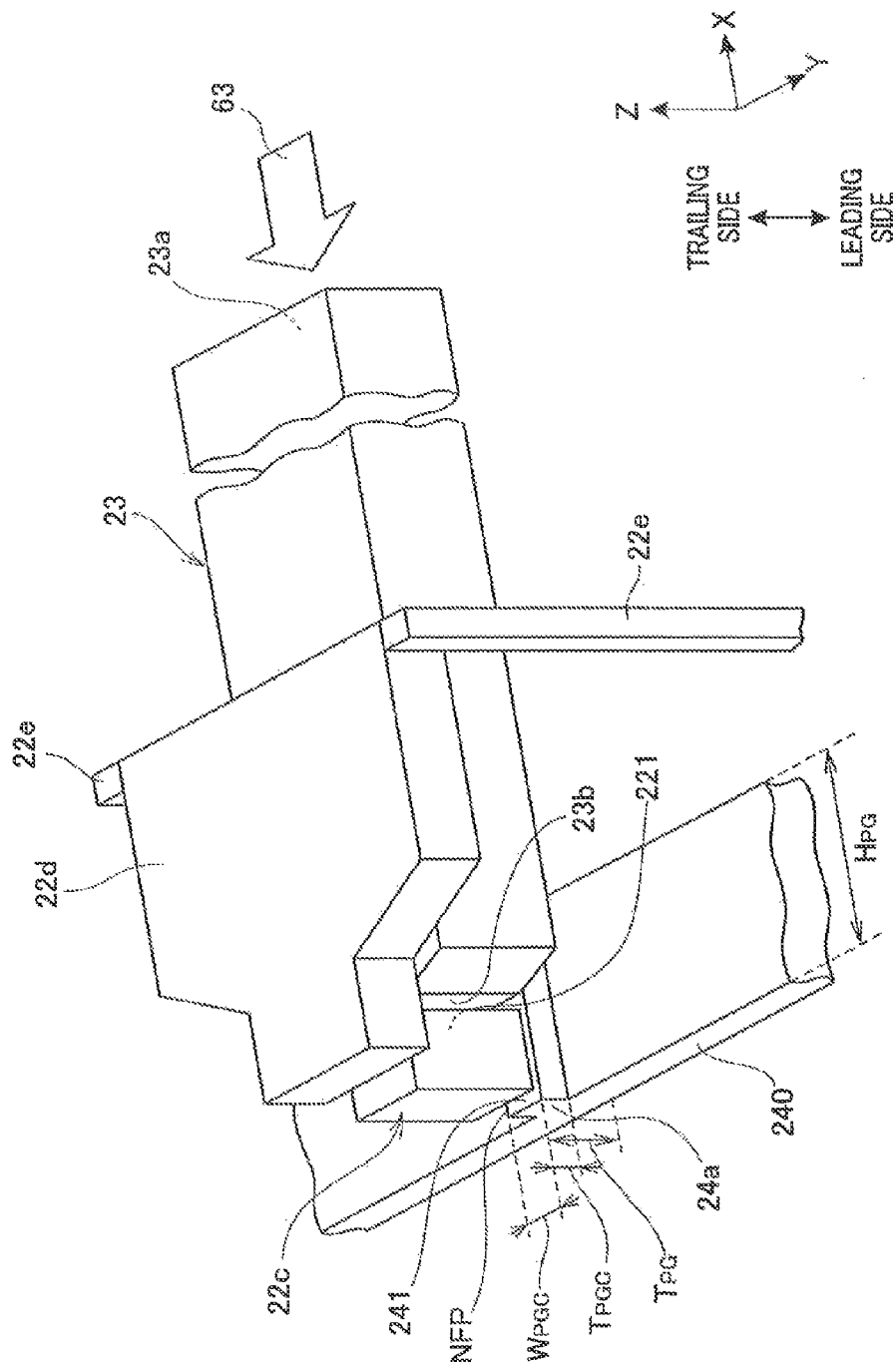
FIG. 12 is a perspective view schematically illustrating a configuration of a waveguide, plasmon-generator, and magnetic pole of the magnetic head according to the embodiment of the present invention.

FIG. 12 is a perspective view schematically illustrating configurations of the waveguide 23, the plasmon-generator 24 and the magnetic pole 22c of the magnetic head 1 in the present embodiment. In FIG. 12, the head part end surface 12a that contains the location where the recording magnetic field and the near-field light are emitted toward the magnetic recording medium is located on the left side.

As illustrated in FIG. 12, the magnetic head 1 in the present embodiment is provided with the waveguide 23 for propagating laser light 63 for near-field light generation, and the plasmon-generator 24 having the projection part 241 that propagates a surface plasmon excited by the laser light (waveguide light) 63 and that opposes the lower surface of the waveguide 23 with a predetermined gap.

The plasmon-generator 24 is provided with a near-field light generating end surface 24a that reaches the head part end surface 12a. Further, a portion sandwiched between a portion of a side surface of the waveguide 23 and a portion of the upper surface (side surface) of the plasmon-generator 24 including the projection part 241 becomes the buffer portion 40 (see FIG. 11). That is, a portion of the projection part 241 is covered by the buffer portion 40. The buffer portion 40 functions to cause the laser light (waveguide light) 63 to couple with the plasmon-generator 24 in a surface plasmon mode. Further, the projection part 241 functions to propagate the surface plasmon excited by the laser light (waveguide light) 63 to the near-field light generating end surface 24a.

The side surface of the waveguide 23 refers to an end surface that is the end surface surrounding the waveguide 23 excluding an end surface 23b located on the head part end surface 12a side and the rear end surface 23a on the opposite side of the end surface 23b. The side surface of the waveguide 23 is a surface allowing the laser light (waveguide light) 63 propagating through the waveguide 23 (which is equivalent to a core) to be totally reflected. In the present embodiment, a portion of the side surface of the waveguide 23 that is in contact with the buffer portion 40 becomes the lower surface of the waveguide 23.

More specifically, the laser light (waveguide light) 63 propagated to the vicinity of the buffer portion 40 couples with optical configurations of the waveguide 23 having a predetermined refractive index $n_{WG}$, the buffer portion 40 having a predetermined refractive index $n_{BF}$ and the plasmon-generator 24 composed of a conductive material such as metal, and induces a surface plasmon mode in the projection part 241 of the plasmon-generator 24. That is, the laser light (waveguide light) 63 couples with the plasmon-generator 24 in a surface plasmon mode. The induction of the surface plasmon mode is enabled by configuring the refractive index $n_{BF}$ of the buffer portion 40 to be smaller than the refractive index $n_{WG}$ of the waveguide 23 ($n_{BF}<n_{WG}$). In practice, evanescent light is excited in the buffer portion 40 from optical interface conditions of the waveguide 23 (which is the core) and the buffer portion 40. Next, in a form in which the evanescent light and charge fluctuation excited on the surface (projection part 241) of the plasmon-generator 24 are coupled, the surface plasmon mode is induced and the surface plasmon 70 is excited (see FIG. 14). Here, the projection part 241 is located closest to the waveguide 23, and the width in the Y-axis direction is extremely small so that it is easy for an electric field to concentrate. Therefore, the surface plasmon 70 is easily excited.

As illustrated in FIG. 12, the plasmon-generator 24 has a flat plate part 240, and the projection part 241 that projects from the flat plate part 240 toward the waveguide 23 side. An end surface that forms a portion of the head part end surface 12a becomes the near-field light generating end surface 24a.

A portion of the projection part 241 opposes the waveguide 23 via the buffer portion 40 and extends to the near-field light generating end surface 24a. This allows the plasmon-generator 24 to realize a function of propagating the surface plasmon excited by the laser light (waveguide light) that propagated through the waveguide 23. That is, the plasmon-generator 24 couples with the waveguide light in a surface plasmon mode and propagates the surface plasmon above the projection part 241. As a result, near-field light is generated from a near-field light generator NFP at the near-field light generating end surface 24a.

It is preferable that a projection height $T_{PGC}$ of the projection part 241 be 15-45 nm. Further, it is preferable that a width $W_{PGC}$ of the projection part 241 in the Y-axis direction at the near-field light generating end surface 24a be smaller than the wavelength of the laser light (waveguide light) 63 and be 15-30 nm. Further, the waveguide 23 is located on a more trailing side than the plasmon-generator 24, and, when viewed from the air bearing surface side, a height $T_{PG}$ from the lower end of the flat plate part 240 to the upper end (upper surface) of the projection part 241 is preferably 65-205 nm, and more preferably about 130 nm. Further, a length $H_{PG}$ in the X-axis direction of the plasmon-generator 24 is preferably 1.0-1.4 µm, and more preferably about 1.2 µm.

Figure 13A:
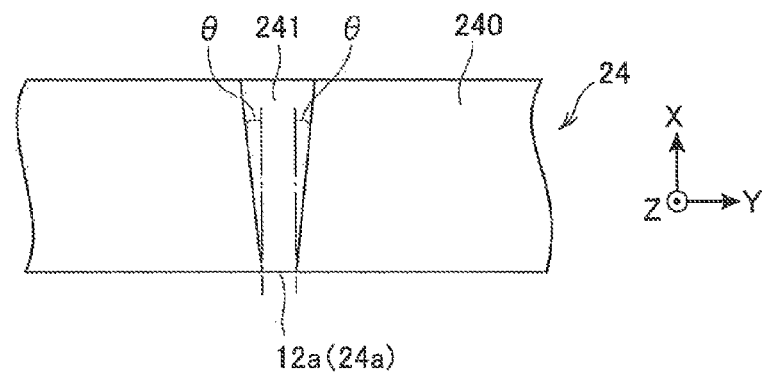
FIGS. 13A-13C are plan views schematically illustrating shapes of a projection part of a plasmon-generator according to the embodiment of the present invention.
Figure 13B:
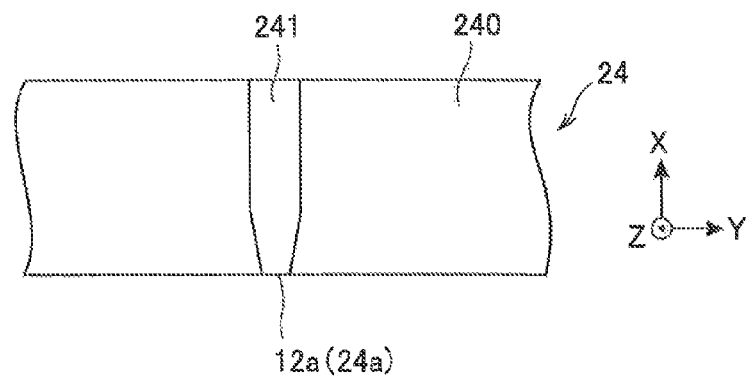
Figure 13C:
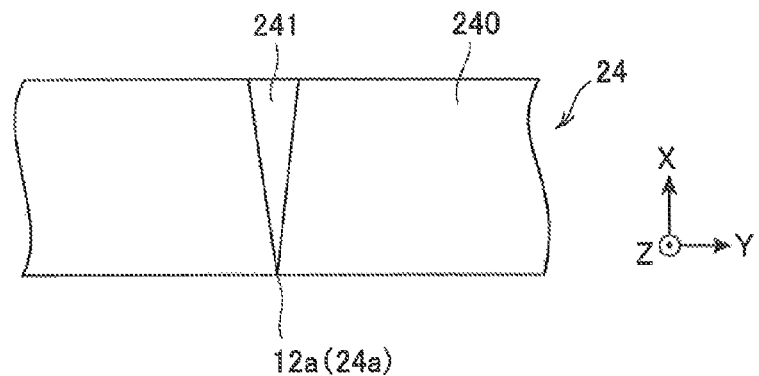

In the present embodiment, the shape of the upper surface of the projection part 241 is a rectangle. However, the shape of the upper surface of the projection part 241 is not limited to a rectangle. For example, as illustrated in FIG. 13A, the shape of the upper surface of the projection part 241 may be a trapezoidal shape formed from a short side located on the head part end surface 12a, a long side located on the head part rear end surface 12b side, and two oblique sides respectively connecting ends of the short side and the long side, and having a width in the Y-axis direction that gradually increases from the head part end surface 12a toward the head part rear end surface 12b side. Further, as illustrated in FIG. 13B, the shape of the upper surface of the projection part 241 may be such a shape that the width in the Y-axis direction gradually increase from the head part end surface 12a to a predetermined location along the X-axis direction, and the width in the Y-axis direction is constant from this location to the head part rear end surface 12b side. Further, as illustrated in FIG. 13C, the shape of the upper surface of the projection part 241 may be substantially a triangular shape having an apex located on the head part end surface 12a and the width in the Y-axis direction that gradually increases toward the head part rear end surface 12b side. By making the shape of the upper surface of the projection part 241 into these shapes, the light density of the near-field light radiated on the magnetic disk 301 can be increased and the light spot diameter can be reduced. In the case illustrated in FIG. 13A, the angle θ formed by each of the two oblique sides of the trapezoidal shape of the projection part 241 and the X-axis is preferably less than 10 degrees, more preferably 1-3 degrees, and particularly preferably about 2 degrees.

The flat plate part 240 of the plasmon-generator 24 can function to release heat generated at the near-field light generator NFP at the near-field light generating end surface 24a of the plasmon-generator 24 from the near-field light generator NFP. This allows excessive temperature rise in the plasmon-generator 24 to be suppressed, and can contribute to avoiding an unnecessary projection of the near-field light generating end surface 24a and a significant decrease in light use efficiency of the plasmon-generator 24.

It is preferable that the plasmon-generator 24 be formed of a conductive material such as a metal, for example, Pd, Pt, Rh, Ir, Ru, Au, Ag or Cu, or an alloy of at least two kinds of metals selected from these metals.

The waveguide 23 is provided at a location deeper than the magnetic pole 22c in the X-axis direction (height direction) with a predetermined gap relative to a rear end surface 221 of the magnetic pole 22c (see FIG. 12). An insulating layer 32j (see FIG. 14) is provided between the rear end surface 221 of the magnetic pole 22c and the end surface 23b of the waveguide 23 (see FIG. 12).

With regard to the shape of the waveguide 23, the width in the track width direction (Y-axis direction) may be a constant. However, as illustrated in FIG. 12, the width may gradually increase from the end surface 23b of the waveguide 23 toward the deeper side in the X-axis direction (height direction). The width in the track width direction (Y-axis direction) at the rear end surface 23a of the waveguide 23 can be set to be, for example, about 0.5-20 µm. The width in the track width direction (Y-axis direction) at the end surface 23b can be set to be, for example, about 0.3-10 µm. The thickness in the Z-axis direction can be set to be about 0.1-4 µm. The length in the X-axis direction can be set to be, for example, about 10-300 µm.

The upper surface of the waveguide 23 is joined with the protective layer 31 (see FIG. 11). The lower surface and the two end surfaces in the track width direction (Y-axis direction) of the waveguide 23 are joined with the ninth insulating layer 32i (see FIG. 11). Here, the waveguide 23 is composed of a material having the refractive index $n_{WG}$ is higher than a refractive index $n_{IS}$ of a constituent material of the ninth insulating layer 32i and the protective layer. For example, when the wavelength $\lambda_L$ of the laser light is 600 nm and the ninth insulating layer 32i and the protective layer 31 are formed from $SiO_2$ (silicon dioxide; n=1.46), the waveguide 23 may be formed from $Al_2O_3$ (alumina; n=1.63). Further, when the ninth insulating layer 32i and the protective layer 31 are formed from $Al_2O_3$ (n=1.63), the waveguide 23 may be formed from $SiO_xN_y$ (n=1.7-1.85), $Ta_2O_5$ (n=2.16), $Nb_2O_5$ (n=2.33), TiO (n=2.3-2.55), or $TiO_2$ (n=2.3-2.55). When the waveguide 23 is composed of such material, due to good optical characterization that the material has, propagation loss of the laser light (waveguide light) 63 can be kept low. Further, while the waveguide 23 functions as the core, the ninth insulating layer 32i and the protective layer 31 function as the cladding so that a total reflection condition is achieved on the entire side surface. This allows more laser light (waveguide light) 63 to reach the location of the buffer portion 40, and the propagation efficiency of the waveguide 23 to be improved.

Further, the waveguide 23 has multilayer structure of dielectric materials, and may have a structure in which a layer located closer to the plasmon-generator 24 has a higher refractive index n. For example, such a multilayer structure is realized by sequentially laminating dielectric materials obtained by suitably varying values of composition ratios X and Y in $SiO_xN_y$. The number of laminating layers can be, for example, 8-12 layers. As a result, when the laser light (waveguide light) 63 is linearly polarized in the Z-axis direction, the laser light (waveguide light) 63 can propagate more on the buffer portion 40 side in the Z-axis direction. In this case, by selecting the composition and layer thickness of each layer and the number of layers of the multilayer structure, a desired propagation location in the Z-axis direction of the laser light (waveguide light) 63 can be realized.

The buffer portion 40 is formed of a dielectric material having a refractive index $n_{BF}$ lower than the refractive index $n_{WG}$ of the waveguide 23. For example, when the wavelength $\lambda_L$ of the laser light is 600 nm and the waveguide 23 is formed from $Al_2O_3$ (alumina; n=1.63), the buffer portion 40 may be formed from $SiO_2$ (silicon dioxide; n=1.46). Further, when the waveguide 23 is formed from $Ta_2O_5$ (n=2.16), the buffer portion 40 may be formed from $SiO_2$ (n=1.46) or $Al_2O_3$ (n=1.63). In these cases, the buffer portion 40 can be a part of the ninth insulating layer 32i (see FIG. 11) that functions as the cladding and that is composed of $SiO_2$ (n=1.46) or $Al_2O_3$ (n=1.63). Further, the length $L_{BF}$ in the X-axis direction (see FIG. 14) of the buffer portion 40, which is the portion sandwiched by the lower surface of the waveguide 23 and the projection part 241, is preferably 0.5-5 µm, and is preferably larger than the wavelength $\lambda_L$ of the laser light (waveguide light) 63. In this case, this portion, for example, as compared to a so-called "focal region" of the case where the laser light is concentrated to the buffer portion 40 and the plasmon-generator 24 and is coupled in a surface plasmon mode, is a much broader region and a very stable coupling in a surface plasmon mode is possible. Further, it is preferable that the thickness $T_{BF}$ in the Z-axis direction (see FIG. 14) of the buffer portion 40 be 10-200 nm. The length $L_{BF}$ and the thickness $T_{BF}$ of the buffer portion 40 are important parameters for obtaining suitable excitation and propagation of a surface plasmon.

The specific configuration of the thermally-assisted magnetic disk device described above is an example of a thermally-assisted magnetic disk device to which the characterization evaluation method according to the present embodiment is applicable. However, the configuration of the thermally-assisted magnetic disk device that is the characterization evaluation target is not limited to that described above.

For example, when the projection part 241 that projects from the flat plate part 240 of the plasmon-generator 24 is viewed from the head part end surface 12a side, the shape of the projection part 241 may be a substantially trapezoidal shape, a substantially inverted trapezoidal shape, and the like. When the projection part 241 is viewed from the head part end surface 12a side, a corner at the intersection of a lateral side (side along the Z-axis direction) of the projection part 241 and the flat plate part 240 may have a rounded shape.

Figure 15:
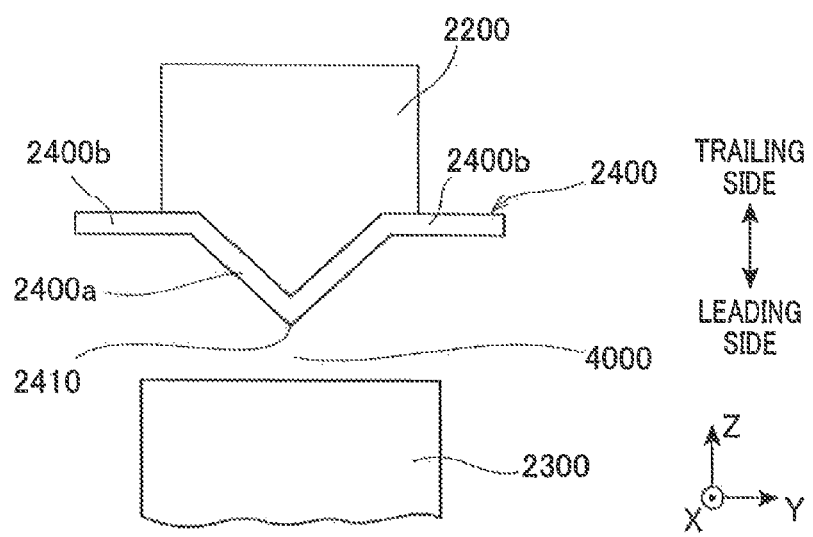
FIG. 15 is a plan view, from the perspective of an air bearing surface side, schematically illustrating another example of a configuration of the magnetic head according to the embodiment of the present invention.

Further, as illustrated in FIG. 15, the magnetic head may be provided with a plasmon-generator 2400 and a magnetic pole 2200, the plasmon-generator 2400 being provided on a waveguide 2300 with a buffer portion 4000 interposed therebetween, and the magnetic pole 2200 being provided on the plasmon-generator 2400. In this case, when viewed from the head part end surface side, the plasmon-generator 2400 includes a substantially V-shaped part 2400a, an extended parts 2400b continued from upper end portions of the substantially V-shaped part 2400a and spreading in the Y-axis direction, and a propagation edge 2410 located at an apex of the substantially V-shaped part 2400a and extending in the X-axis direction. In the substantially V-shaped part 2400a of the plasmon-generator 2400, a portion of the magnetic pole 2200 can be embedded.

Next, operation of the magnetic head 1 in the present embodiment having the above-described configuration is explained. FIG. 14 is a schematic view for explaining thermally-assisted magnetic recording using a surface plasmon mode in the magnetic head 1 in the present embodiment.

As illustrated in FIG. 14, when writing to the magnetic recording layer of the magnetic disk 301 by the electromagnetic transducer element 22 is performed, initially, the laser light (waveguide light) 63 emitted from the laser diode 60 of the light source unit 50 propagates through the waveguide 23. Next, the laser light (waveguide light) 63 that has propagated to the neighborhood of the buffer portion 40 couples with the optical configurations of the waveguide 23 having the refractive index $n_{WG}$, the buffer portion 40 having the refractive index $n_{BF}$ and the plasmon-generator 24, which is composed of a conductive material such as a metal, to induce a surface plasmon mode on the projection part 241 of the plasmon-generator 24. That is, the laser light (waveguide light) 63 couples with the plasmon-generator 24 in a surface plasmon mode. In practice, evanescent light is excited in the buffer portion 40 from optical interface conditions of the waveguide 23 (which is the core) and the buffer portion 40. Next, in a form in which the evanescent light and fluctuation of charges excited on the metal surface (projection part 241) of the plasmon-generator 24 are coupled, the surface plasmon mode is induced and the surface plasmon is excited. More precisely, the surface plasmon, which is an elementary excitation in this system, couples with an electromagnetic wave. Therefore, a surface plasmon polariton is excited. However, hereafter, as an abbreviation, the surface plasmon polariton is referred to a surface plasmon. The induction of the surface plasmon mode is enabled by configuring the refractive index $n_{BF}$ of the buffer portion 40 to be smaller than the refractive index $n_{WG}$ of the waveguide 23 ($n_{BF}<n_{WG}$) and further suitably selecting the length $L_{BF}$ in the X-axis direction of the buffer portion 40 (that is, the length of the coupling portion of the waveguide 23 and the plasmon-generator 24) and the thickness $T_{BF}$ in the Z-axis direction of the buffer portion 40.

In the induced surface plasmon mode, the surface plasmon 70 is excited on the projection part 241 of the plasmon-generator 24 and propagates on the projection part 241 along the direction of an arrow 71. The projection part 241 is not in contact with the magnetic pole 22c, and thus is not negatively affected by the magnetic pole 22c when the magnetic pole 22c is not properly adjusted to allow the surface plasmon to be efficiently excited. As a result, the surface plasmon can be intentionally propagated on the projection part 241.

As described above, by propagating on the projection part 241 along the direction of the arrow 71, the surface plasmon 70 reaches the head part end surface 12a. The surface plasmon 70, that is, an electric field, concentrates on the near-field light generator NFP at the near-field light generating end surface 24a to which the projection part 241 ends up. As a result, from the near-field light generator NFP, near-field light 72 is generated. The near-field light 72 is emitted toward the magnetic recording layer of the magnetic disk 301, reaches the surface of the magnetic disk 301, and heats a magnetic recording layer portion of the magnetic disk 301. Thus, the anisotropy magnetic field (coercive force) of the heated portion is reduced to a value that allows writing to be performed, and writing is performed by a magnetic field applied to this portion.

By the characterization evaluation method according to the present embodiment, characterizations of the thermally-assisted magnetic disk device having the configuration as described above can be precisely evaluated upon a consideration of parameters related to heat.

The embodiment explained above is described in order to facilitate understanding of the present invention and is not described in order to limit the present invention. Therefore, it is intended that each element disclosed in the above embodiment also includes all design modifications and equivalents that belong to the technical scope of the present invention.

What is claimed is:

1. A method for characterization evaluation of a thermally-assisted magnetic recording device that is provided with a magnetic recording medium and a thermally-assisted magnetic recording head, comprising:
   a recording step for recording a reference signal to the magnetic recording medium using the thermally-assisted magnetic recording head;
   a heating step for heating a first heating point and a second heating point on the magnetic recording medium using the thermally-assisted magnetic recording head, the first heating point being positioned at an inner side along a track width direction with respect to a track width center point of a recording bit, where the reference signal is recorded, of the magnetic recording medium, and the second heating point being positioned at an outer side along the track width direction with respect to the track width center point, wherein a distance between the second heating point and the track width center point is substantially the same as a distance between the track width center point and the first heating point;

a measurement step for measuring the reproducing signal intensity of the reference signal after the magnetic recording medium is heated;

a step for obtaining a maximum distance between the first heating point and the second heating point when a reproducing signal intensity measurement value of the reference signal after the magnetic recording medium is heated is approximately zero; and an evaluation step for evaluating a characterization of the thermally-assisted magnetic recording device based on the maximum distance, wherein in the heating step, the first heating point and the second heating point are heated without applying a recording magnetic field from the thermally-assisted magnetic recording head to the magnetic recording medium.

2. The method for characterization evaluation according to claim 1, wherein the heating step includes a first heating step for heating the first heating point and the second heating point that are positioned such that the reproducing signal intensity measurement value of the reference signal after heating is not approximately zero; and an n-th ("n" is a whole number of two or more) heating step for heating the first heating point and the second heating point that are positioned such that the reproducing signal intensity measurement value of the reference signal after heating is approximately zero, wherein the distance between the first heating point and the second heating point is the maximum distance, in each of the heating steps, the magnetic recording medium is heated such that a distance between the first heating point and the second heating point in a m-th ("m" is a whole number of two or more and "n" or less) heating step is shorter than a distance between the first heating point and the second heating point in a (m−1)-th heating step, and the measurement step is performed after each of the heating steps.

3. The method for characterization evaluation according to claim 1, further comprising:

a profile generation step for obtaining a maximum distance between the first heating point and the second heating point under a heating condition with which at least both of temperatures in the first heating point and the second heating point on the magnetic recording medium are a predetermined temperature, and for generating a profile illustrating a temperature distribution on the magnetic recording medium when the reproducing signal intensity measurement value of the reference signal after the magnetic recording medium is heated under the heating condition is approximately zero; and a thermal gradient calculation step for calculating a thermal gradient on the magnetic recording medium when the reproducing signal intensity measurement value of the reference signal after the magnetic recording medium is heated is approximately zero, based on the profile generated in the profile generation step, wherein a characterization of the thermally-assisted magnetic recording device is evaluated based on the thermal gradient calculated in the thermal gradient calculation step.

4. The method for characterization evaluation according to claim 1, further comprising:

a profile generation step for obtaining a maximum distance between the first heating point and the second heating point in a heating condition with which at least both of temperatures in the first heating point and the second heating point on the magnetic recording medium are a predetermined temperature, and for generating a profile illustrating a relationship between the maximum distance and a maximum temperature on the magnetic recording medium when the reproducing signal intensity measurement value of the reference signal after the magnetic recording medium is heated under the heating condition is approximately zero; and a temperature distribution calculation step for calculating a temperature distribution on the magnetic recording medium during signal recording using the thermally-assisted magnetic recording device, based on the profile generated in the profile generation step, wherein a characterization of the thermally-assisted magnetic recording device is evaluated based on the temperature distribution calculated in the temperature distribution calculation step.

5. The method for characterization evaluation according to claim 1, wherein in the heating step, the magnetic recording medium is heated such that the temperatures in the first heating point and the second heating point in the recording layer of the magnetic recording medium is higher than a Curie temperature of a magnetic material configuring a magnetic particle in the recording layer of the magnetic recording medium.

6. The method for characterization evaluation according to claim 1, wherein the thermally-assisted magnetic recording head includes:

a magnetic pole that generates a recording magnetic field from an end surface that forms a portion of an air bearing surface opposing the magnetic recording medium;

a waveguide through which light for exciting surface plasmon propagates; and a plasmon generator that generates near-field light from a near-field light generating end surface that forms a portion of the air bearing surface by being coupled with the light in a surface plasmon mode, wherein in the heating step, the first heating point and the second heating point are heated by radiating the near-field light generated from the plasmon generator on the first heating point and the second heating point.

* * * * *